US012256656B2

(12) United States Patent
Strnad et al.

(10) Patent No.: US 12,256,656 B2
(45) Date of Patent: Mar. 25, 2025

(54) AGRICULTURAL TRENCH DEPTH SENSING SYSTEMS, METHODS, AND APPARATUS

(71) Applicant: Precision Planting LLC, Tremont, IL (US)

(72) Inventors: Michael Strnad, Delavan, IL (US); Nicholas Minarich, Shorewood, IL (US)

(73) Assignee: Precision Planting LLC, Tremont, IL (US)

(*) Notice: Subject to any disclaimer, the term of this patent is extended or adjusted under 35 U.S.C. 154(b) by 969 days.

(21) Appl. No.: 17/270,198

(22) PCT Filed: Aug. 16, 2019

(86) PCT No.: PCT/IB2019/056949
§ 371 (c)(1),
(2) Date: Feb. 22, 2021

(87) PCT Pub. No.: WO2020/039322
PCT Pub. Date: Feb. 27, 2020

(65) Prior Publication Data
US 2021/0307236 A1    Oct. 7, 2021

Related U.S. Application Data

(60) Provisional application No. 62/722,386, filed on Aug. 24, 2018.

(51) Int. Cl.
*A01B 79/00*    (2006.01)
*A01B 27/00*    (2006.01)
(Continued)

(52) U.S. Cl.
CPC .......... *A01B 79/005* (2013.01); *A01B 27/005* (2013.01); *A01B 63/008* (2013.01);
(Continued)

(58) Field of Classification Search
CPC ..... A01B 79/005; A01B 79/02; A01B 27/005; A01B 63/008; A01B 63/1112; A01C 7/08; A01C 7/105; A01C 7/203; A01C 5/064
See application file for complete search history.

(56) References Cited

U.S. PATENT DOCUMENTS 5,524,560 A    6/1996 Carter
5,841,282 A    11/1998 Christy et al.
(Continued)

FOREIGN PATENT DOCUMENTS

WO    2012/129442 A2    9/2012
WO    2014/066650 A1    5/2014
(Continued)

OTHER PUBLICATIONS

European Patent Office, International Search Report for related International Application No. PCT/IB2019/056949, mail date Nov. 25, 2019.

*Primary Examiner* — Jamie L McGowan

(57) ABSTRACT

An agricultural trench depth sensing system and method includes a light source (2002), a receiver (2003) and a sensor (2004). The light source directs light downwardly toward a trench previously opened in a soil surface. The receiver is disposed at an angle relative to the light source to receive reflected light. A sensor connected to the receiver senses a pattern of the reflected light. A monitoring system in communication with the sensor, generates a data frame containing triangulated line coordinates and intensity values of the reflected light indicative of a measured depth of the trench. The generated data frame may be associated with GPS coordinates for generating spatial maps and may be used to control operating parameters. The generated data frames may also identify relative soil moisture versus trench depth,
(Continued)

or presence of dry topsoil or residue in the trench, or to identify seeds, seed spacing and seed depth.

41 Claims, 20 Drawing Sheets

(51) Int. Cl.
    *A01B 63/00*     (2006.01)
    *A01B 79/02*     (2006.01)
    *A01C 5/06*     (2006.01)
    *G01B 11/22*     (2006.01)
    *A01C 7/08*     (2006.01)

(52) U.S. Cl.
    CPC .............. *A01B 79/02* (2013.01); *A01C 5/064* (2013.01); *G01B 11/22* (2013.01); *A01C 7/08* (2013.01)

(56) References Cited

U.S. PATENT DOCUMENTS

| | | | |
|---|---|---|---|
| 6,356,830 B1 | 3/2002 | Adamchuck et al. | |
| 7,370,589 B2 | 5/2008 | Wilkerson et al. | |
| 8,204,689 B2 | 6/2012 | Christy et al. | |
| 8,550,020 B2 | 10/2013 | Sauder et al. | |
| 8,869,629 B2* | 10/2014 | Noble | G01F 1/7046 |
| | | | 73/861.73 |
| 9,179,595 B2 | 11/2015 | Kormann et al. | |
| 10,257,973 B2 | 4/2019 | Hubner et al. | |
| 10,262,413 B2* | 4/2019 | Strnad | G01N 33/24 |
| 10,768,331 B2* | 9/2020 | Koch | G01S 13/02 |
| 2013/0112122 A1 | 5/2013 | Blomme et al. | |
| 2014/0035752 A1 | 2/2014 | Johnson | |
| 2014/0303854 A1 | 10/2014 | Zielke | |
| 2014/0352587 A1* | 12/2014 | Wilhelmi | A01C 7/128 |
| | | | 111/184 |
| 2014/0365084 A1* | 12/2014 | Chan | B64D 43/00 |
| | | | 701/50 |
| 2015/0094917 A1* | 4/2015 | Blomme | A01C 5/062 |
| | | | 701/50 |
| 2015/0268218 A1* | 9/2015 | Troxler | G01N 9/24 |
| | | | 342/21 |
| 2015/0289438 A1 | 10/2015 | Sauder et al. | |
| 2015/0298438 A1 | 10/2015 | Nevalainen et al. | |
| 2015/0310633 A1* | 10/2015 | Nelan | G06T 7/0002 |
| | | | 382/110 |
| 2017/0367251 A1 | 12/2017 | Hamilton | |
| 2018/0128933 A1 | 5/2018 | Koch et al. | |
| 2018/0168094 A1 | 6/2018 | Koch et al. | |
| 2018/0174291 A1* | 6/2018 | Asada | G06T 7/0004 |
| 2019/0029167 A1 | 1/2019 | Weigel | |
| 2019/0075714 A1* | 3/2019 | Koch | A01B 79/005 |
| 2019/0254223 A1 | 8/2019 | Eichhorn et al. | |
| 2019/0373801 A1 | 12/2019 | Schoeny et al. | |
| 2020/0107487 A1 | 4/2020 | Antich | |
| 2020/0232792 A1* | 7/2020 | Swanson | A01C 5/064 |
| 2020/0352081 A1 | 11/2020 | Arnett et al. | |
| 2020/0352088 A1* | 11/2020 | Arnett | A01B 49/027 |
| 2021/0027449 A1* | 1/2021 | Ferrari | A01B 69/001 |
| 2021/0190754 A1* | 6/2021 | Stoller | G01N 33/24 |
| 2021/0195821 A1* | 7/2021 | Knobloch | A01B 47/00 |
| 2022/0000008 A1 | 1/2022 | Hubner et al. | |
| 2022/0142039 A1 | 5/2022 | Eichhorn et al. | |

FOREIGN PATENT DOCUMENTS

| | | |
|---|---|---|
| WO | 2014/153157 A1 | 9/2014 |
| WO | 2015/171908 A1 | 11/2015 |
| WO | 2015/171915 A1 | 11/2015 |
| WO | 2016/205424 A1 | 12/2016 |
| WO | 2016205421 A1 | 12/2016 |
| WO | 2016205422 A1 | 12/2016 |
| WO | 2017/143125 A1 | 8/2017 |
| WO | 2017/197292 A1 | 11/2017 |
| WO | 2018/018050 A1 | 1/2018 |
| WO | 2019236990 A1 | 12/2019 |
| WO | 2020039322 A1 | 2/2020 |

* cited by examiner

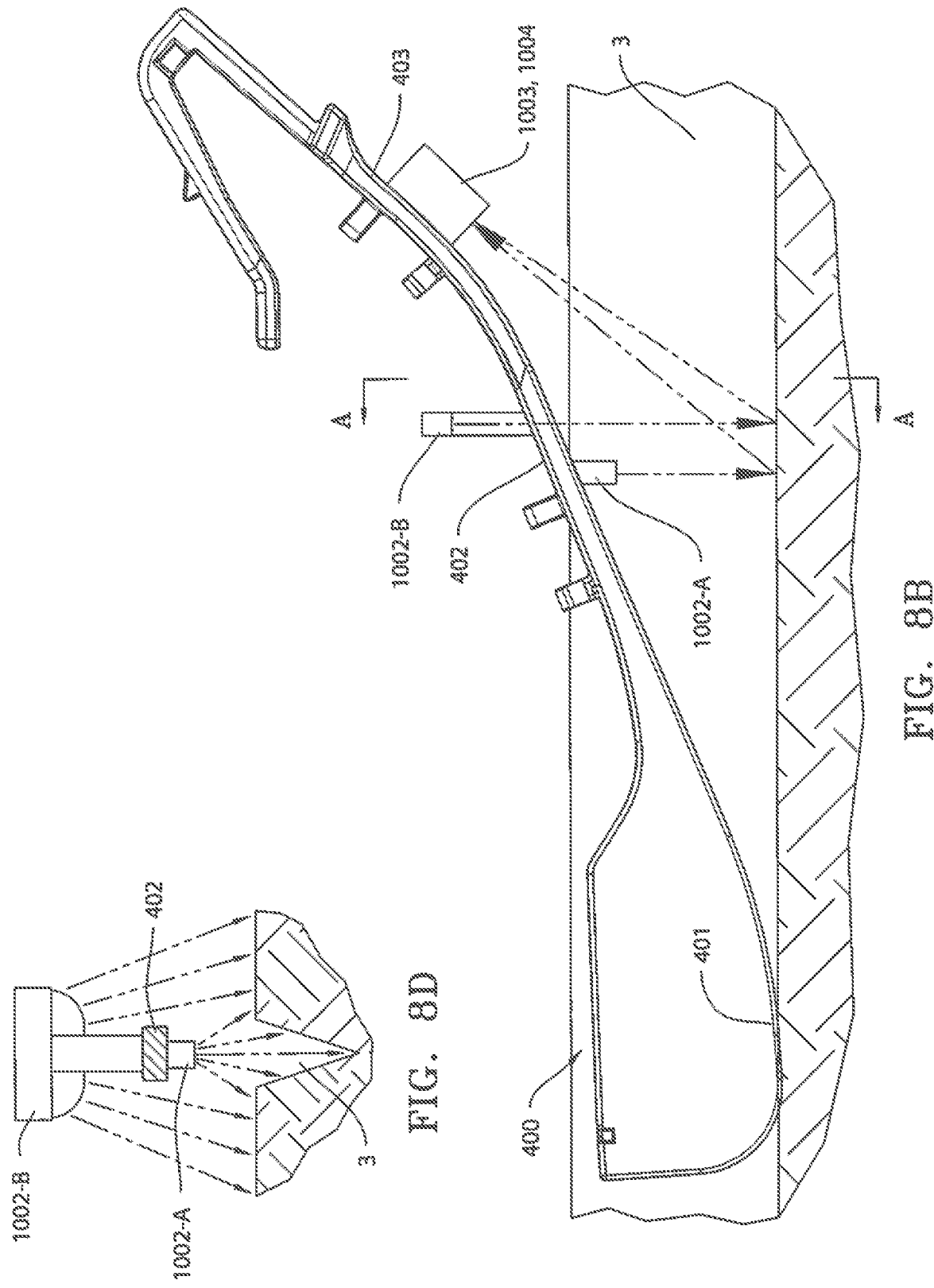

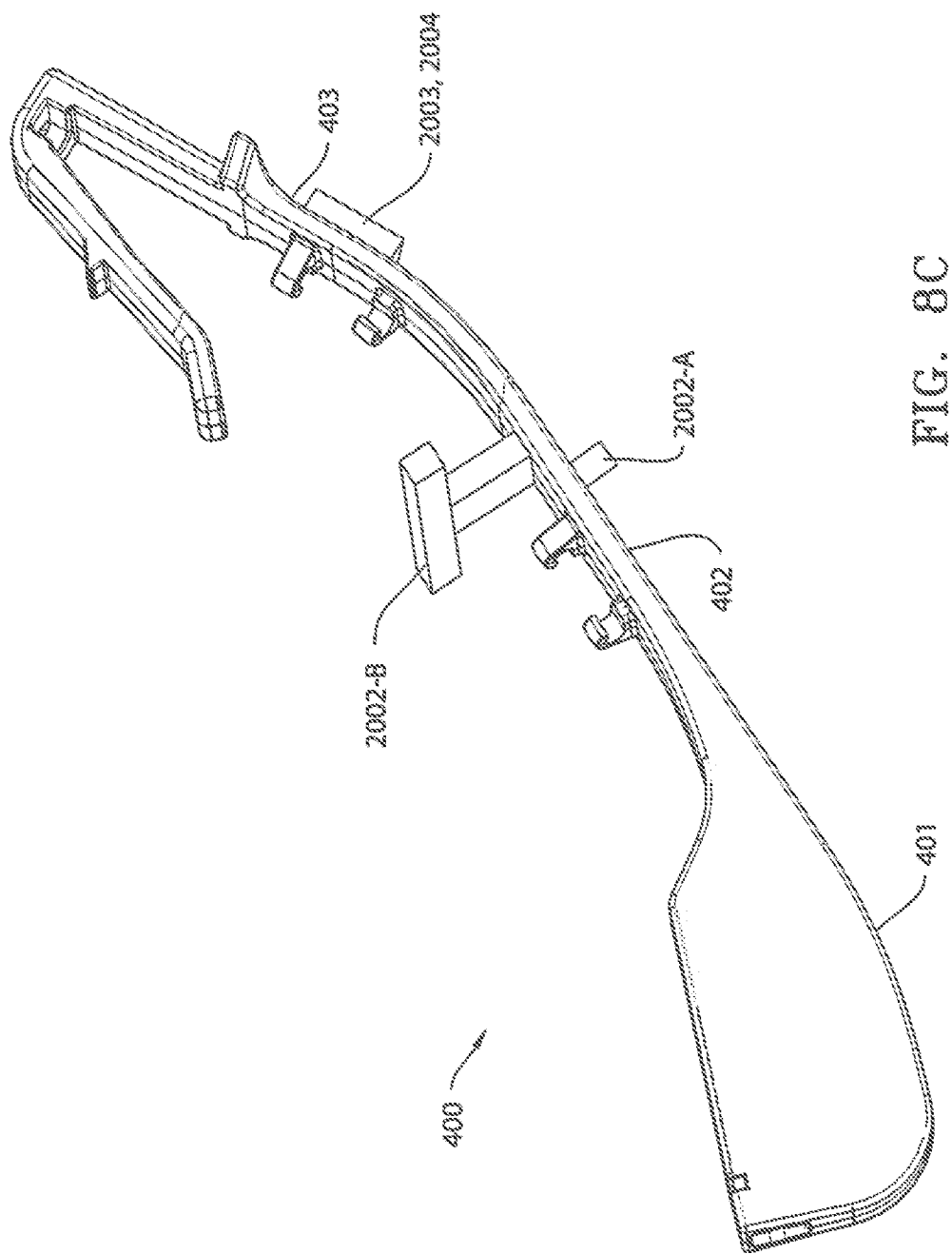

AGRICULTURAL TRENCH DEPTH SENSING SYSTEMS, METHODS, AND APPARATUS

CROSS-REFERENCE TO RELATED APPLICATIONS

This application claims priority to U.S. Ser. No. 62/722,386, filed 24 Aug. 2018, which is incorporated herein in its entirety.

BACKGROUND

In recent years, farmers have recognized the need to select and maintain the proper planting depth to ensure the proper seed environment (e.g., temperature and moisture) and seedling emergence. To improve agronomic practices, it would also be desirable for the farmer to understand the relationship between actual planting depth and metrics such as emergence and yield. Conventional agricultural planters include only apparatus for adjusting a maximum planting depth, which may not be maintained during operation due to soil conditions or insufficient downpressure on the planter row unit. Disclosed in U.S. Patent Application Publication Number 2015/0298438 is a depth sensor that has a pivot arm having left and right ground engaging fingers that is pivotably connected to an angular displacement sensor mounted to a bracket on a row unit or to a seed firmer. The ground engaging fingers engage the soil surface on either side of the trench. As the depth of the trench changes, the pivot arm rotates causing a signal change in the angular displacement sensor. Other depth measurement systems are disclosed in International Patent Publication Nos. WO2018/018050 and WO2017/197292. While these systems provide a good measurement, it is desirable to increase the accuracy and/or durability of the system.

BRIEF DESCRIPTION OF THE DRAWINGS

FIG. 8B is a right side elevation view of the firmer of FIG. 8A.

FIG. 8C is a perspective view of the firmer of FIG. 8B.

FIG. 8D is a rear section view of the firmer of FIG. 8B.

DETAILED DESCRIPTION

All references cited herein are incorporated herein in their entireties. If there is a conflict between a definition herein and in an incorporated reference, the definition herein shall control.

Figure 1:
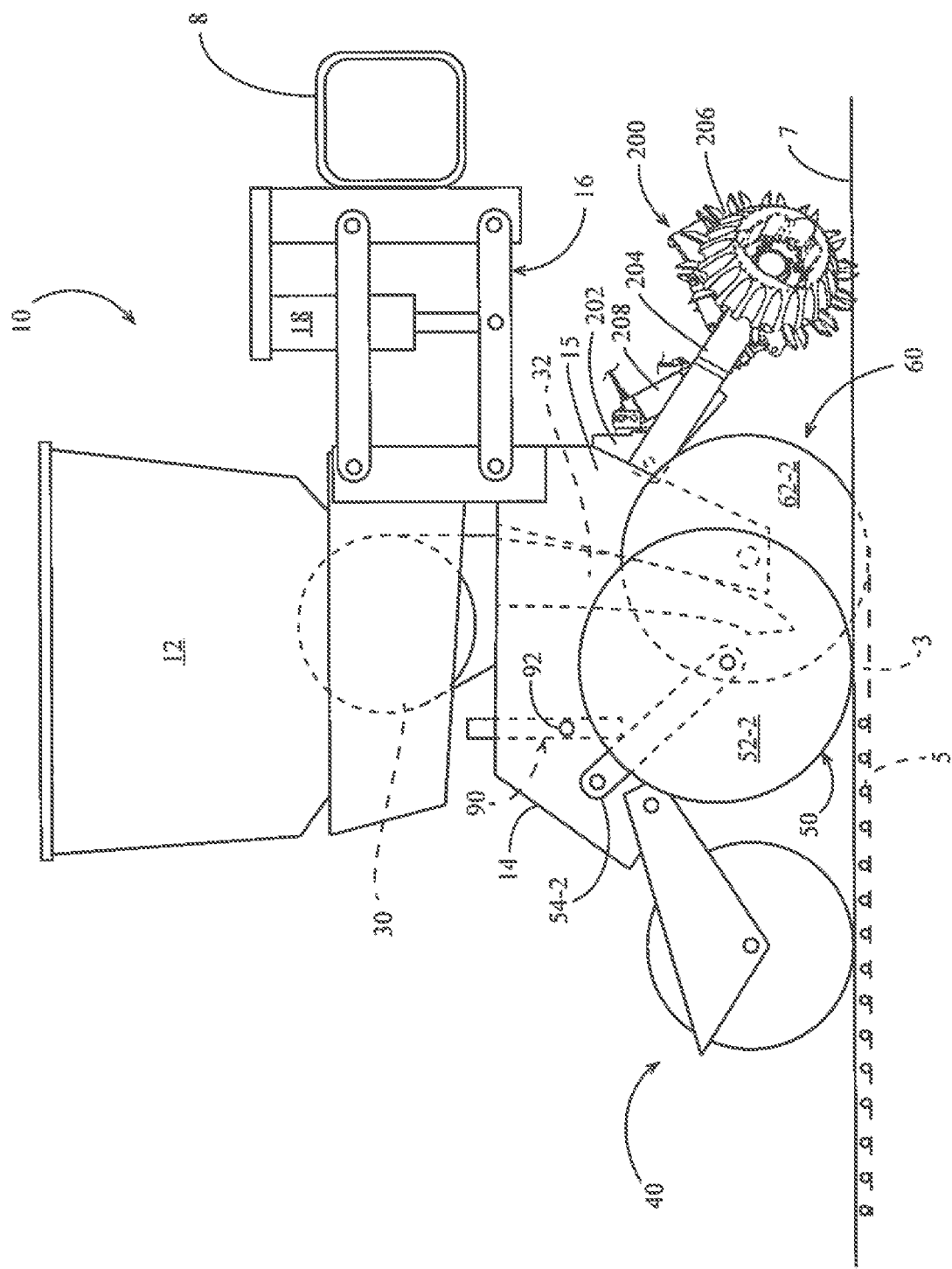
FIG. 1 is a right side elevation view of an embodiment of an agricultural row unit.
Figure 2:
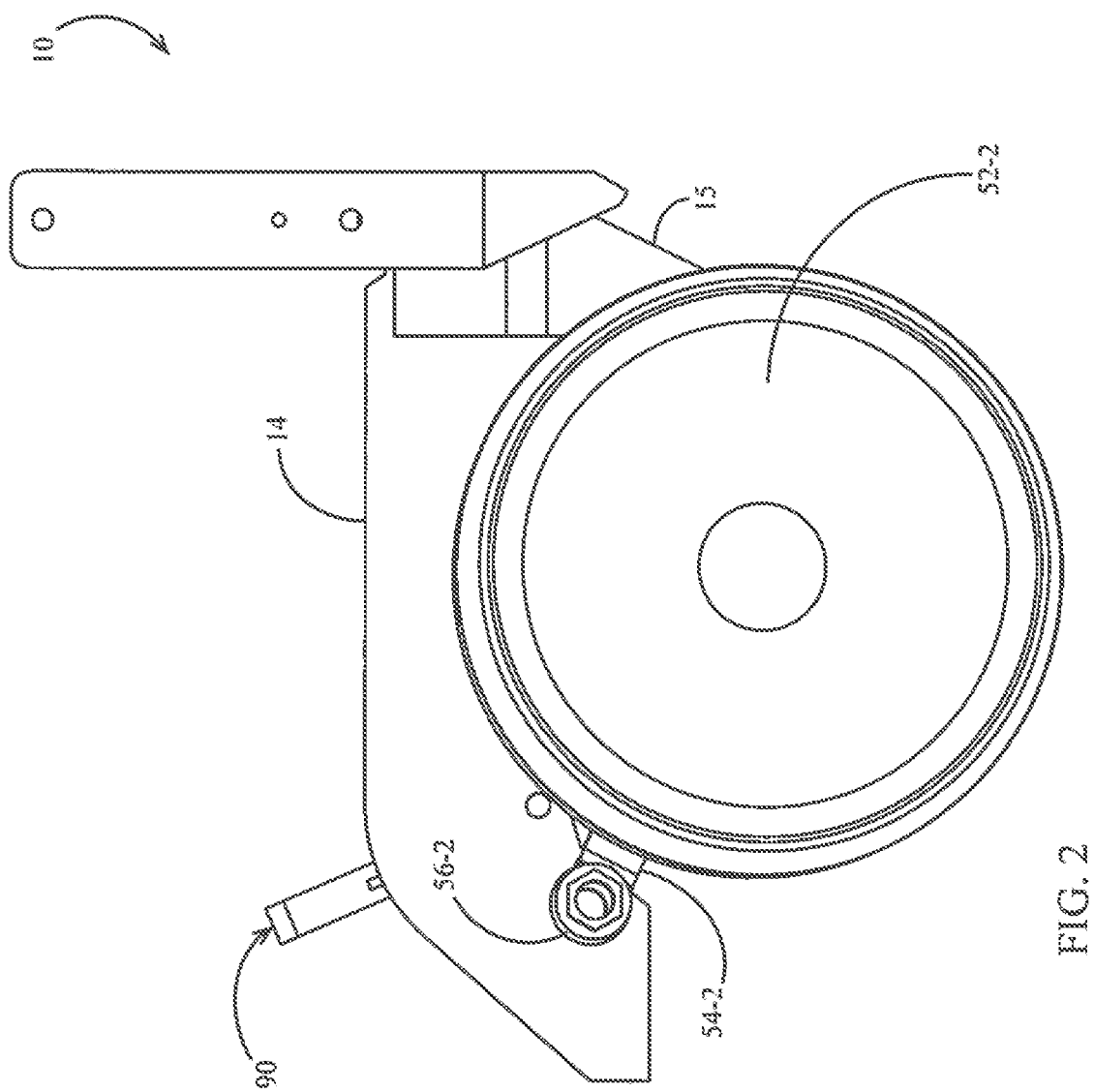
FIG. 2 is a right side elevation view of another embodiment of an agricultural row unit with certain components removed for clarity.
Figure 3:
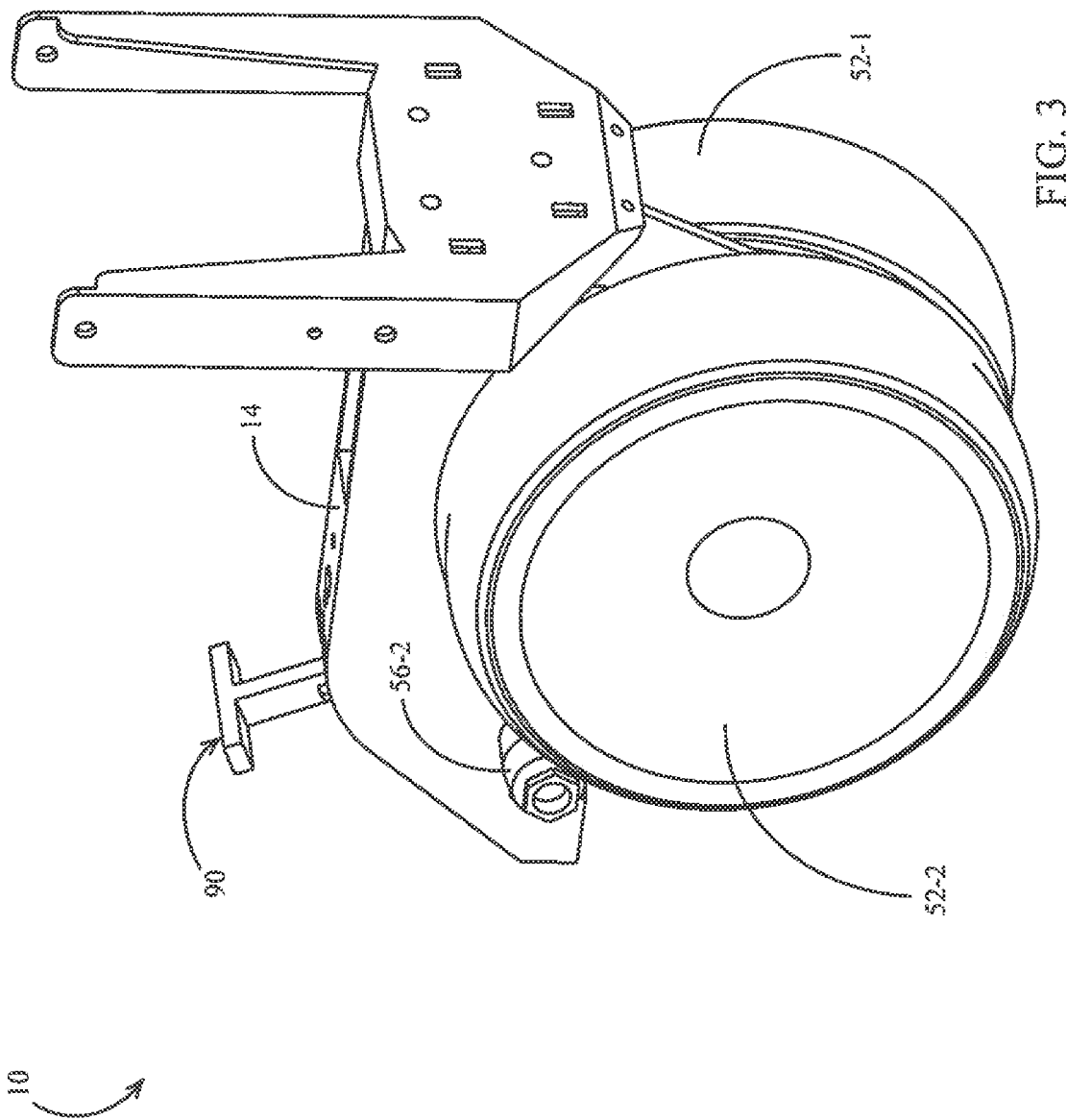
FIG. 3 is a perspective view of the agricultural row unit of FIG. 2.
Figure 4:
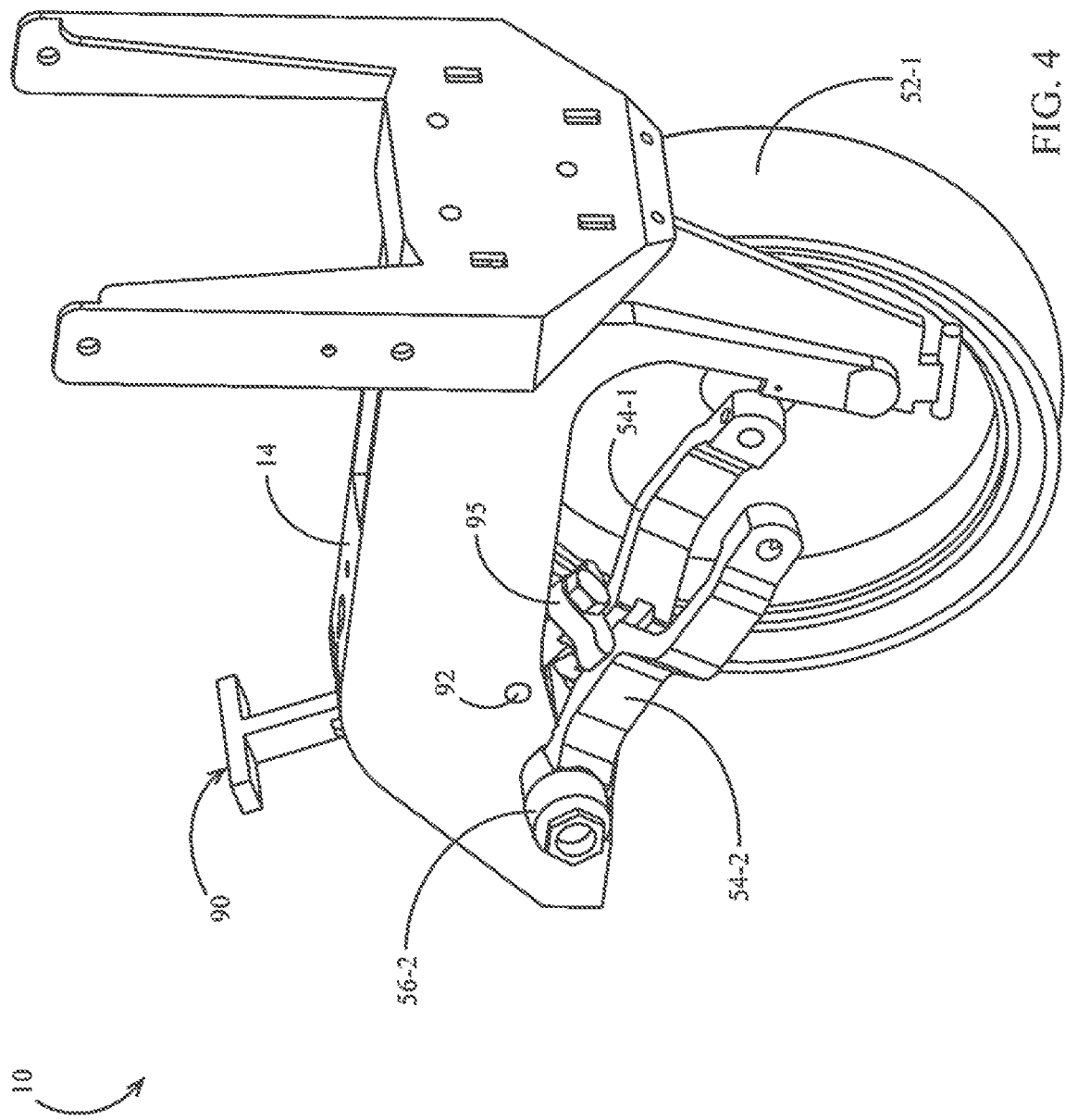
FIG. 4 is a perspective view of the agricultural row unit of FIG. 2 with a right gauge wheel removed for clarity.
Figure 5:
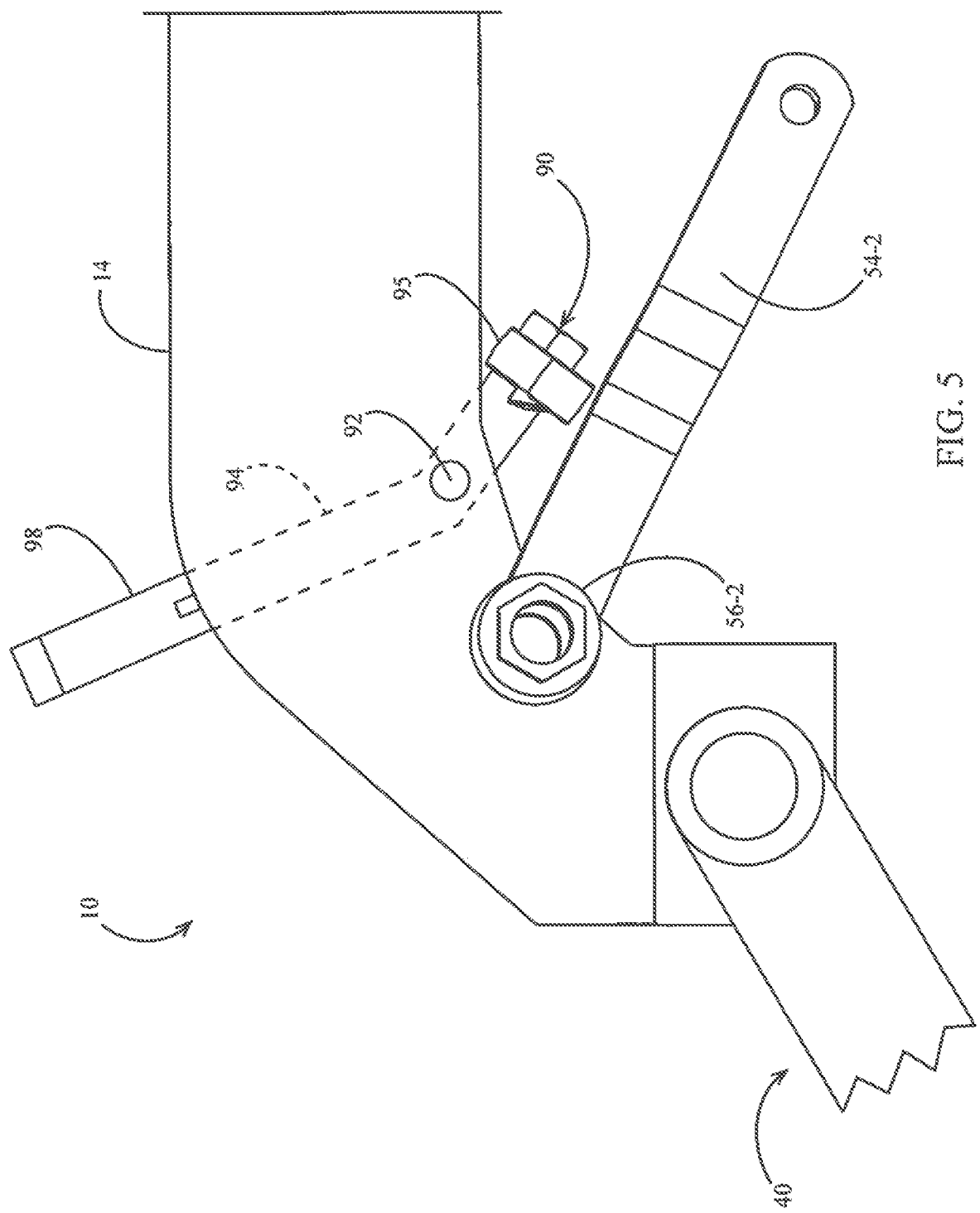
FIG. 5 is an enlarged partial right side elevation view of the agricultural row unit of FIG. 2.
Figure 6:
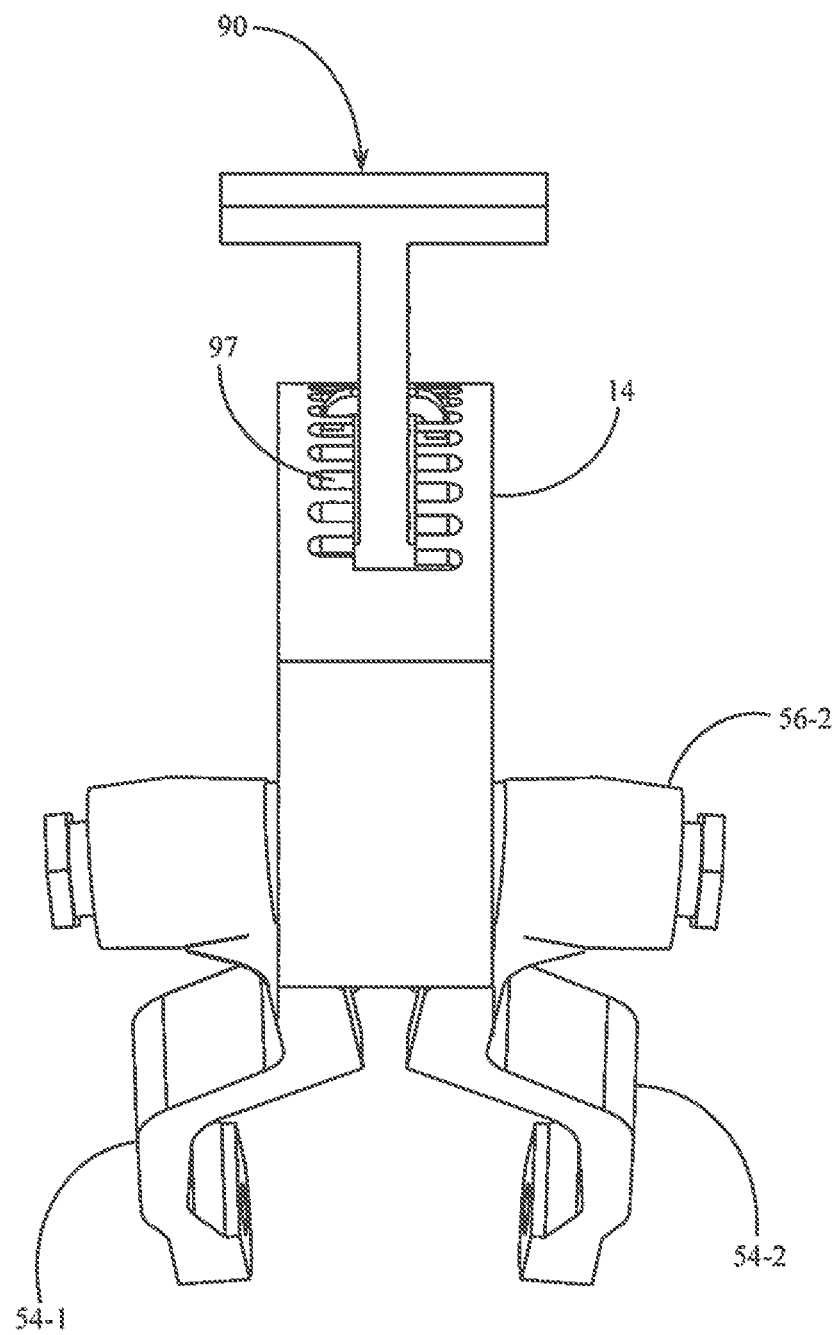
FIG. 6 is a rear elevation view of the agricultural row unit of FIG. 5.

Referring to the drawings, wherein like reference numerals designate identical or corresponding parts throughout the several views, FIG. 1 illustrates an agricultural implement, e.g., a planter, comprising a toolbar 8 to which multiple row units 10 are mounted in transversely spaced relation. Each row unit 10 may be mounted to the toolbar by a parallel arm arrangement 16 such that the row unit 10 is permitted to translate vertically with respect to the toolbar 8. An actuator 18 may be pivotally mounted to the toolbar 8 and the parallel arm arrangement 16 and configured to apply supplemental downpressure to the row unit 10.

The row unit 10 includes a frame 14 supporting an opening disc assembly 60. The opening disc assembly 60 may include two angled opening discs 62 (62-1 and 62-2, respectively) rollingly mounted to a downwardly extending shank 15 of the frame 14 and disposed to open a v-shaped trench 3 in a soil surface 7 as the row unit advances in a forward direction of travel through a field. The row unit 10 may include a gauge wheel assembly 50 including two gauge wheels 52 pivotally mounted to either side of the frame 14 by two gauge wheel arms 54 (54-1 and 54-2, respectively) and disposed to roll along the surface of the soil. A depth adjustment assembly 90 pivotally mounted to the frame 14 at a pivot 92 contacts the gauge wheel arms 54 to limit the upward travel of the gauge wheel arms 54 with respect to the opening discs 62, thus limiting the depth of the trench opened by the opening disc assembly 60. A closing assembly 40 may be pivotally coupled to the frame 14 and configured to move soil back into the trench 3 after the seeds have been deposited in the trench 3.

Continuing to refer to FIG. 1, seeds 5 are communicated from a hopper 12 to a seed meter 30 which may be configured to singulate the supplied seeds. The meter 30 may be a vacuum-type meter such as that disclosed in International Patent Publication No. WO2012/129442. In operation, the seed meter 30 may dispense the singulated seeds into a seed tube 32 removably mounted to the frame 14. The seed tube 32 directs the seeds 5 dispensed by by the seed meter downwardly and rearwardly for depositing in the trench 3.

Continuing to refer to FIG. 1, a row cleaner assembly 200 such as disclosed in U.S. Pat. No. 8,550,020, may be mounted to the forward end of the row unit 10 via a bracket 202 attached to the shank 15. Row cleaner arms 204 are attached to the bracket 202 and extend downward to row cleaner wheels 206. An actuator 208 is disposed between the bracket 202 and a plate (not shown), which is mounted to forwardly extending row cleaner arms 204. The actuator 208 may be in signal communication with a monitor 50 (discussed later) for receiving signals to increase or decrease a downforce applied to the row cleaner assembly 200. The actuator 208 may be a pneumatic actuator as described in U.S. Pat. No. 8,550,020, or the actuator 208 may be hydraulic, electromechanical, or combinations thereof. The actuator 208 may be double acting or single acting.

Turning to FIGS. 2-6, the depth adjustment assembly 90 is illustrated in more detail. The depth adjustment assembly 90 includes a rocker 95 pivotally mounted to a depth adjustment body 94. The depth adjustment body 94 is pivotally mounted to the row unit frame 14 about the pivot 92. A handle 98 is slidably received within the depth adjustment body 94 such that the user can selectively engage and disengage the handle with one of a plurality of depth adjustment slots 97 (FIG. 6) formed within the row unit frame 14. In operation, the upward travel of the gauge wheels 52 is limited by contact of the gauge wheel arms 54 with the rocker 95. When one of the gauge wheels, e.g., left gauge wheel 52-1, encounters an obstruction, the rocker 95 allows the left gauge wheel arm 54-1 to travel upward while lowering the right gauge wheel 52-2 by the same absolute displacement such that the row unit 10 rises by half the height of the obstruction.

Figure 7:
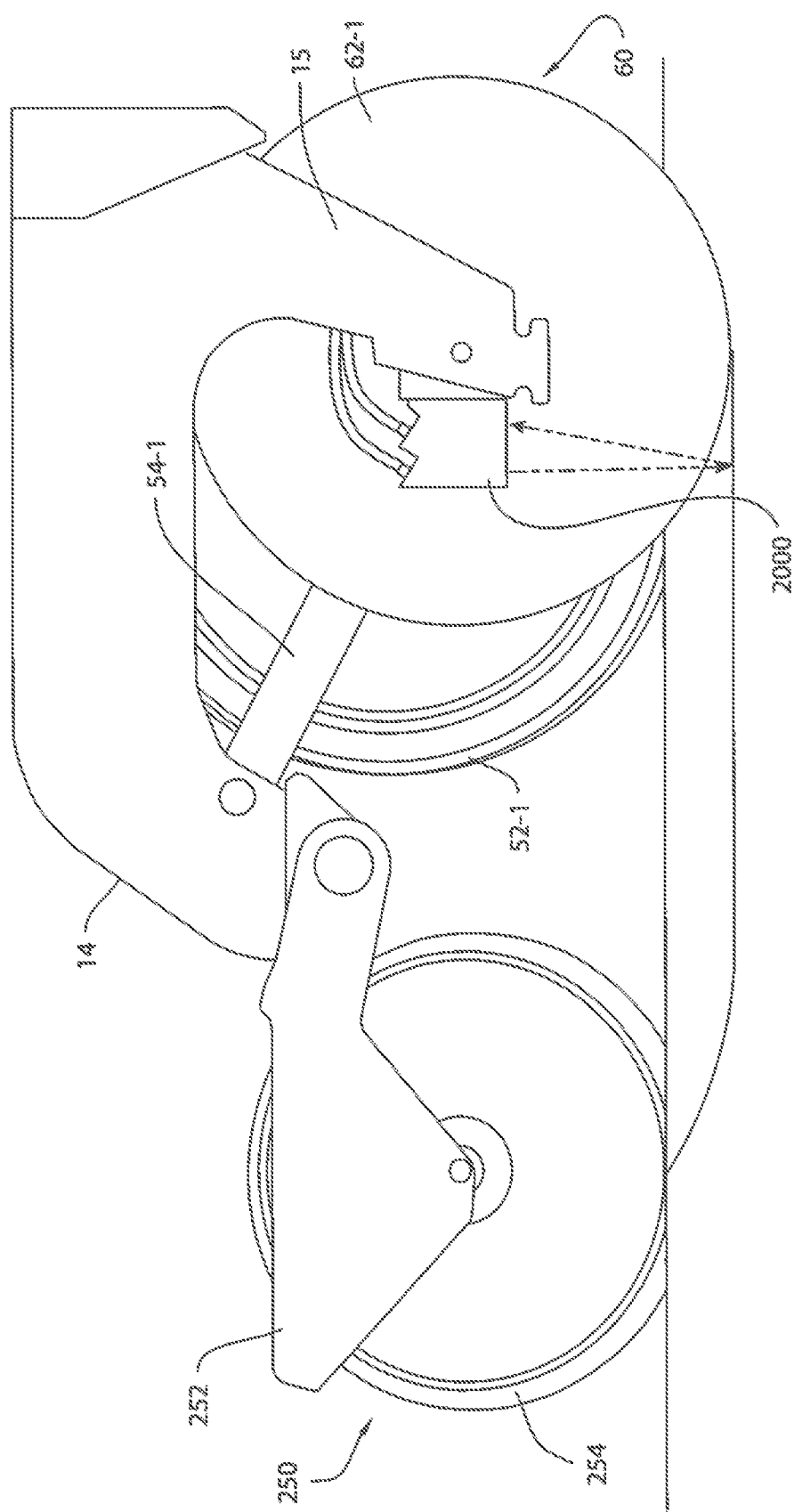
FIG. 7 is a right side elevation view of an embodiment of an agricultural row unit having a laser line triangulator disposed to measure a trench depth.

Turning to FIG. 7, agricultural row unit 10 can optionally further include a trench closing assembly 250. The trench closing assembly 250 includes a closing wheel arm 252 which pivotally attaches to the row unit frame 14. A pair of offset closing wheels 254 are rotatably attached to the closing wheel arm 252 and are angularly disposed to "close" the seed trench 10 by pushing the walls of the open seed trench back together over the deposited seed 5. An actuator may be pivotally attached at one end to the closing wheel arm 252 and at its other end to the row unit frame 14 to vary the down pressure exerted by the closing wheels 254 depending on soil conditions. The closing wheel assembly 250 may be of the type disclosed in International Patent Publication No. WO2014/066650.

Depth Sensing Apparatus

Figure 10:
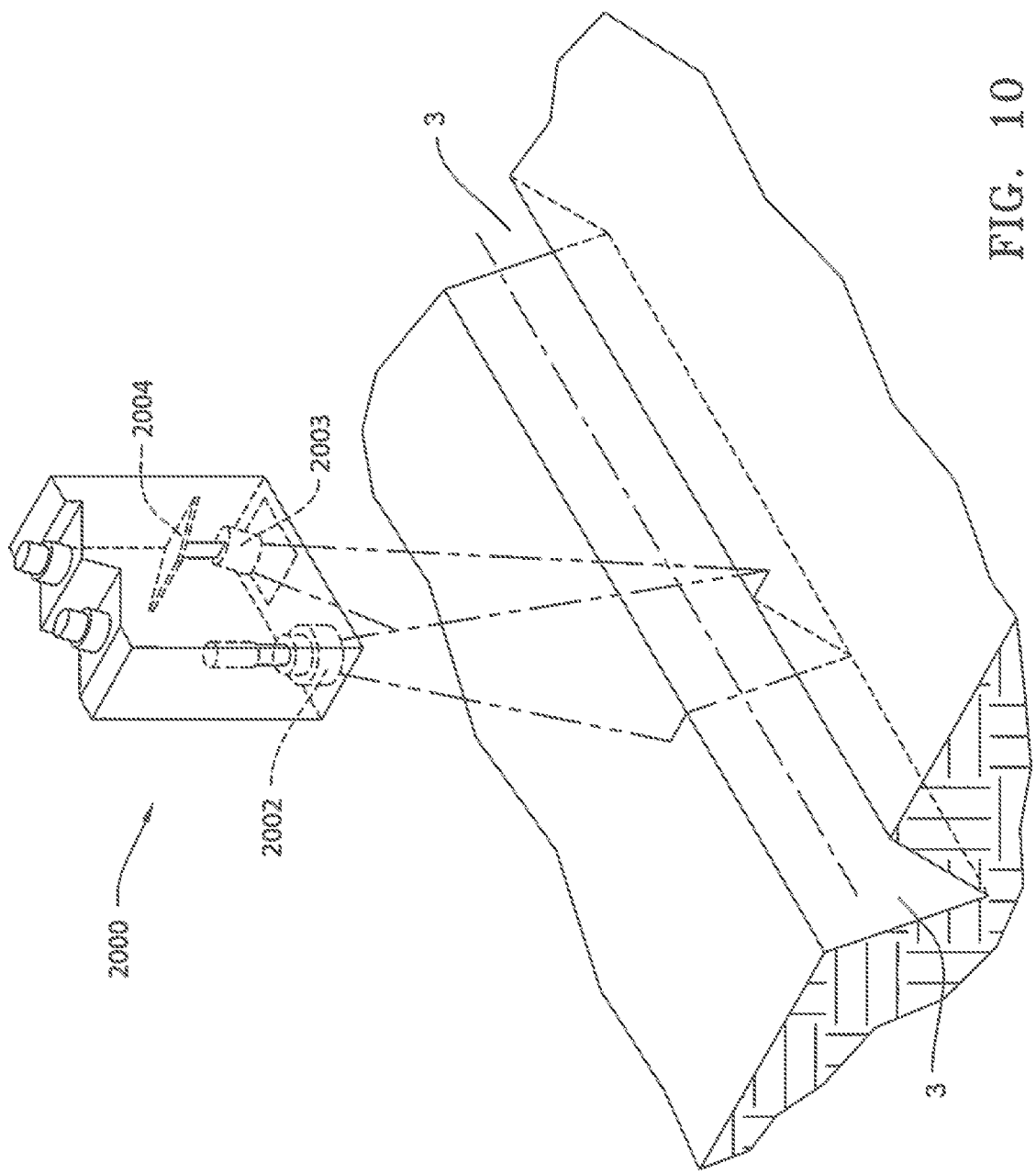
FIG. 10 is a perspective view of a laser line triangulator having both an emitter and a receiver.

In FIG. 7, there is a first embodiment of a light plane triangulator 2000, such as a laser line triangulator, is disposed on shank 15 of agricultural row unit 10 to measure a depth of a trench created by row unit 10. As best viewed in FIG. 10, the light plane triangulator 2000 includes a body 1001 in which a light source 2002, such as a laser light, and a receiver 2003 are disposed. The receiver 2003 is disposed at an angle to the light source 2002 to receive reflected light from a surface upon which light source 2002 illuminates. A sensor matrix 2004 is connected to the receiver 2003 to generate an output signal comprising an image or pattern based on the reflected light from which a data frame is generated providing characteristics of the trench.

An example of a light plane triangulator 2000 in the form of a laser line triangulator is the scanCONTROL 2D/3D laser scanner (laser profile sensor) from Micro-Epsilon of Raleigh. North Carolina, USA, as disclosed in published Brochure No. Y9766353-G021077GKE, incorporated herein by reference and attached as Appendix A.

Figure 8A:
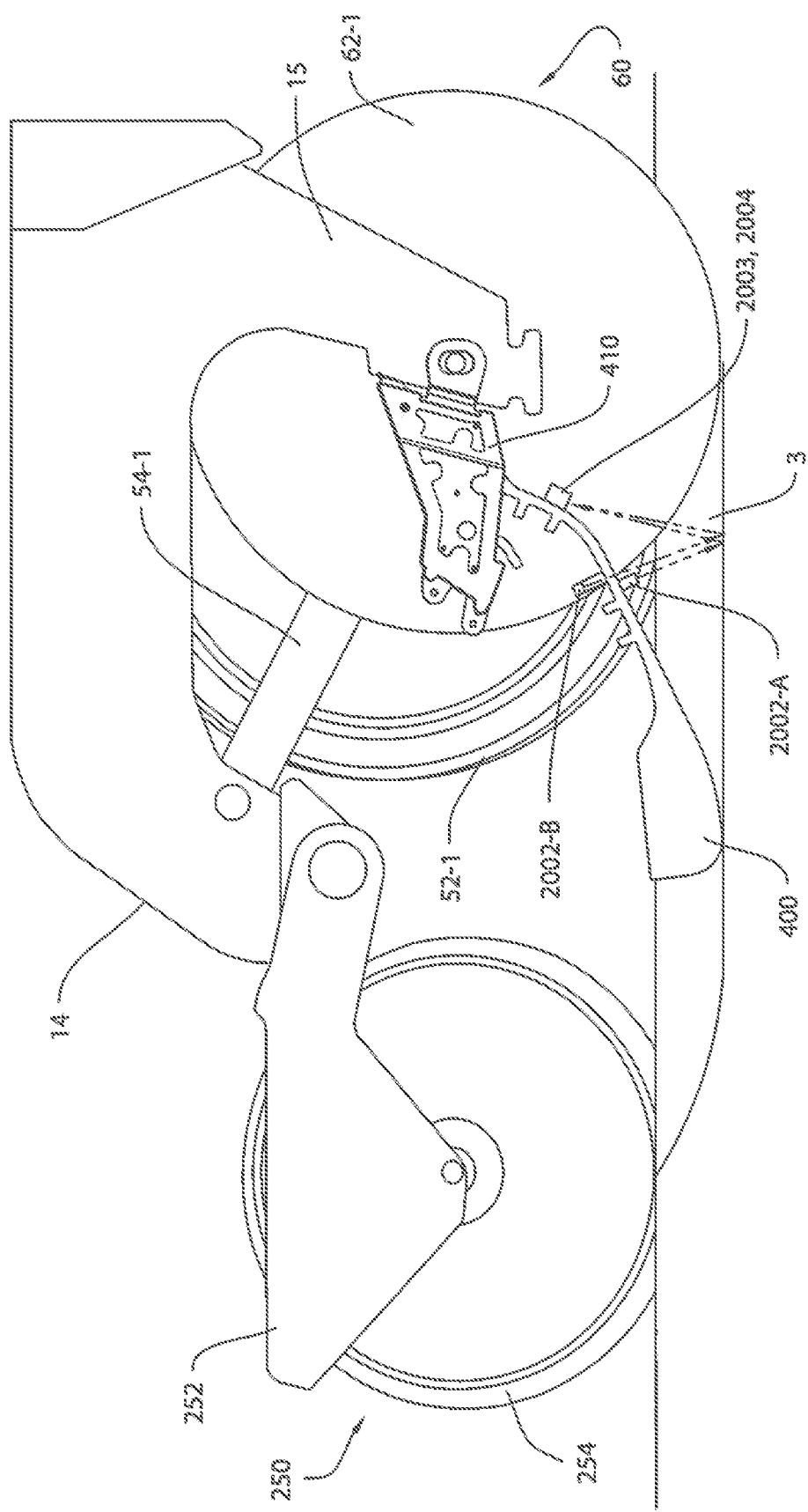
FIG. 8A is a right side elevation view of an embodiment of an agricultural row unit having a laser line triangulator disposed on a firmer to measure a trench depth.
Figure 9:
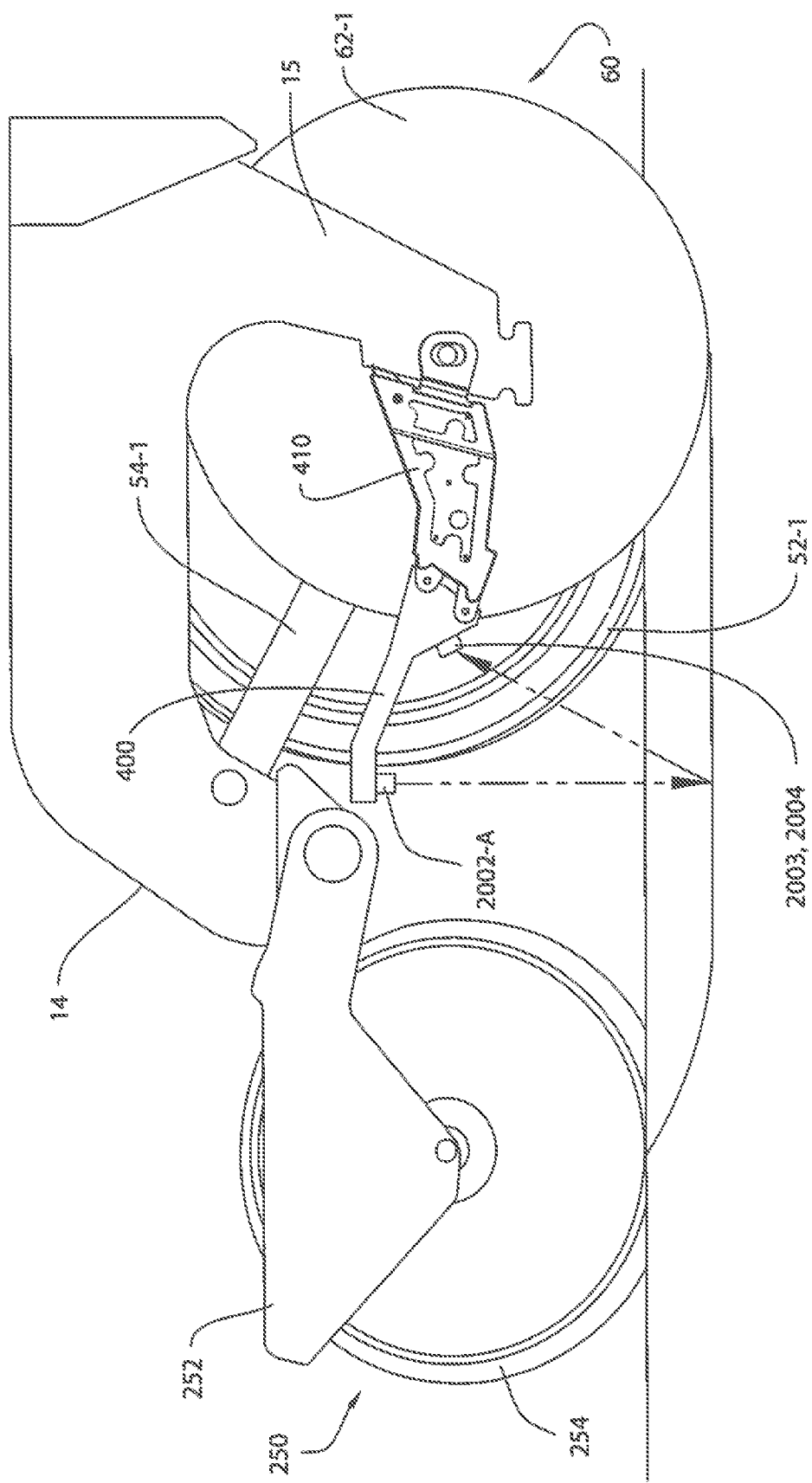
FIG. 9 is a right side elevation view of an embodiment of an agricultural row unit having a laser line triangulator disposed on a rearwardly extending appurtenance to measure a trench depth.

In other embodiments illustrated in FIGS. 8A-8C and FIG. 9, a light source 2002 and receiver 2003 and sensor 2004 can be separately disposed on row unit 10 to allow for placement around other parts on the row unit 10 and still measure the depth of the seed trench 3. For example, the light source 2002, receiver 2003 and sensor 2004 may be disposed on a rearwardly extending appurtenance 400 supported from a bracket 410 mounted to the shank 15 or frame 14 of the row unit 10 and in longitudinal alignment with the trench 3. In one such embodiment, as shown in FIGS. 8A-8C, the appurtenance 400 may be a seed firmer having a trailing end disposed in the trench 3. In another embodiment, as shown in FIG. 9, the appurtenance 400 may be an arm that extends rearwardly above the soil surface.

Referring to FIGS. 8A-8C, the light source 2002-A may be disposed under the appurtenance or seed firmer 400, or the light source 2002-B may be disposed over seed firmer 400, or both light source 2002-A and light source 2002-8 may be used in combination. Turning to FIGS. 8B and 8C, seed firmer 400 has a ground engaging portion 401, an upper portion 402, and a mounting portion 403. Receiver 2003 and sensor 2004 may be disposed on mounting portion 403 and disposed to view the seed trench 3. Light source 2002-A and light source 2002-B may be disposed on the upper portion 402 to direct the light into the trench 3. Light source 2002-A can provide light under seed firmer 400, and light source 2002-B can provide light to either or both sides of seed firmer 400.

In other embodiments, light plane triangulator 2000 may be disposed as a whole unit or by its parts anywhere on row unit 10 that has a view of trench 38.

Light plane triangulator 2000 is in data communication with depth control and a soil monitoring system 300 (discussed later). A depth measured by light plane triangulator 2000 can be displayed on monitor 50 and/or a depth of the trench can be adjusted either manually or automatically as described below.

In one embodiment, the wavelength of the light source can be modulated or alternated to generate different data frames. Each data frame containing the triangulated line pattern and intensity values of the reflected light along the triangulated line pattern for one wavelength. For example, Data Frame A can use 640 nm (red), and Data Frame B can use 940 nm (infrared). The relationship between the intensity values of the pattern of Data Frame A and the pattern of Data Frame B can provide information about the seed trench 3, such as relative moisture versus depth profile of the seed trench 3, identify topsoil failing onto seed, residue falling into seed trench 3, identify seed placement in the seed trench 3 including seed location paired with GPS coordinates, seed spacing, seed population, and/or seed orientation in seed trench 3. In other embodiments, more than two data frames of varying wavelengths, such as Data Frame A, Data Frame B, and Data Frame C, can be used.

In another embodiment, the data frame may be based on four generated images captured using the reflected light. For example, a first wavelength A of structured light is used to illuminate seed trench 3, generating Image A. Wavelength A is then turned off. A second wavelength B of structured light is used to illuminate seed trench 3, generating Image B. Wavelength B is then turned off. Image C is generated with no light illuminating seed trench 3. A white light may be used to illuminate seed trench 3, generating Image D. The white light is then turned off. The generation of Image A, Image B, Image C, and Image D can be done in any order.

For the following calculations, when Image D is not used, the generation of Image D can be omitted.

Figure 14A:
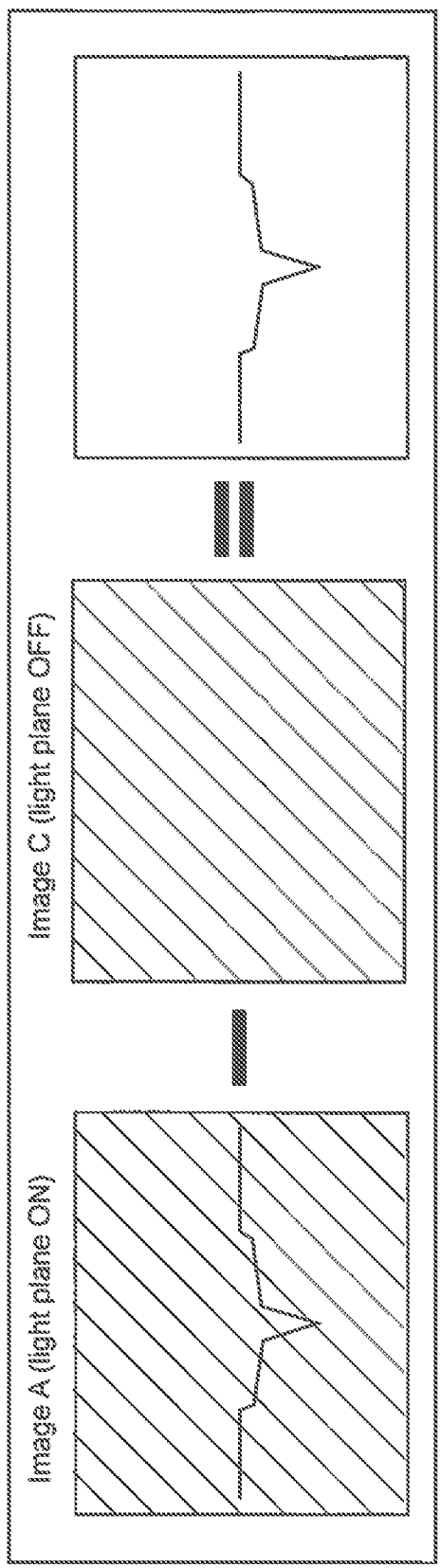
FIG. 14A illustrates processing of images to calculate trench depth.
Figure 14B:
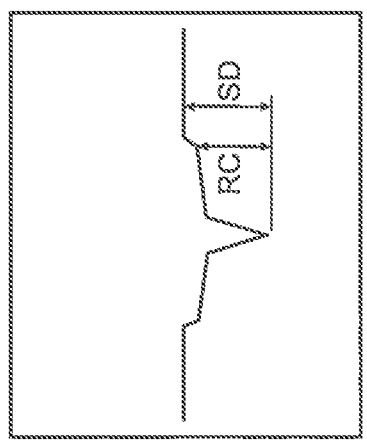
FIG. 14B illustrates a trench depth profile based on processed images from FIG. 14A.
Figure 14C:
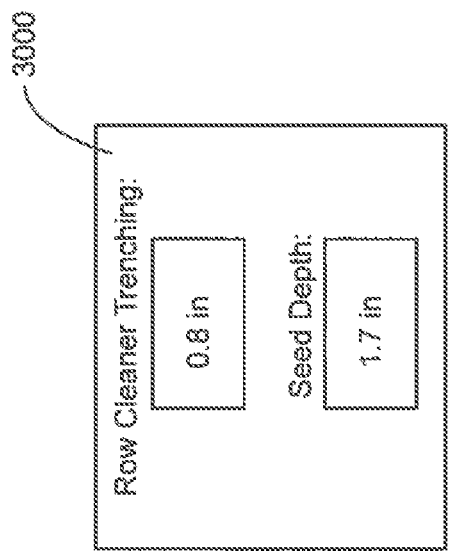
FIG. 14C illustrates an embodiment of a graphical display of seed depth.

A Net Image A pattern is calculated or derived by subtracting Image C from Image A. A Net Image B pattern is calculated or derived by subtracting Image C from Image B. An example of subtracting images is illustrated in FIG. 14A. The Net Image A or Net Image B patterns can then be scaled and filtered to produce a data frame providing characteristics of the trench, wherein the triangulated line pattern and intensity values along the triangulated pattern varies by soil characteristics, which is illustrated in FIG. 14B. In FIG. 14B, SD represents seed depth. The depth RC is subtracted from depth SD to provide a depth of the row cleaner trenching. FIG. 14C illustrates a display screen 3000 showing the row cleaner trenching depth and seed depth. In addition, gauge wheels 52 can compress a portion of seed trench 3. This can be shown as the difference between SD and RC in FIG. 14B. Full trench depth ("true depth") is the depth from the top of seed trench 3 to the bottom of seed trench 3 as measured by depth SD. The depth of gauge wheels 52 to full trench depth can be determined as the difference between depth SD and depth RC.

Figure 15B:
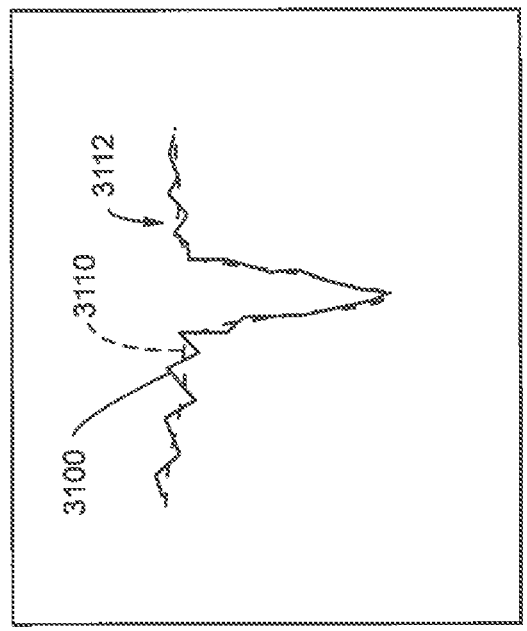
FIG. 15B illustrates a trench uniformity profile.
Figure 15A:
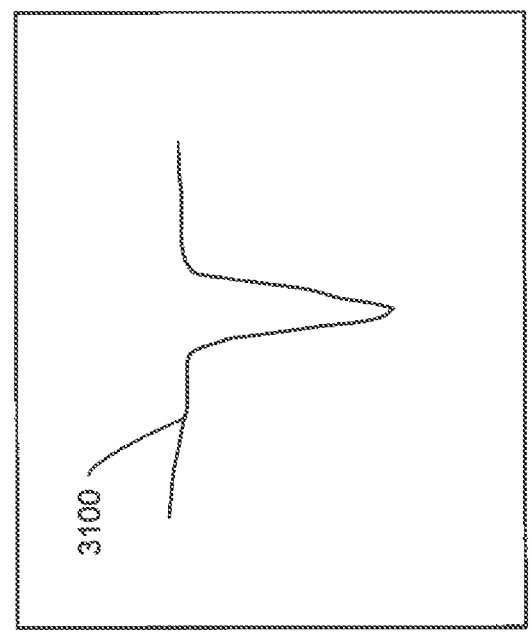
FIG. 15A illustrates a trench uniformity profile.

Net Image A or Net Image B pattern can also be used to measure a uniformity of the furrow. The filtered and scaled Net Image A or Net Image B are used for the calculation. In one embodiment, Net Image A or Net Image B is compared to a trench profile curve. In another embodiment, image to image comparisons can be used. In one embodiment, root mean square (RMS) error is used to compare Net Image A or Net Image B to a nominal trench shape. FIG. 15A is intended to illustrate a trench profile 3100 having 99% uniformity. FIG. 15B is intended to illustrate a trench profile 3100 having 75% uniformity with a trench profile curve 3110. The trench profile 3100 can be displayed on monitor 50 graphically as illustrated in FIG. 15A or 15B or numerically as a percent uniformity. Uniformity can be displayed based on the individual values calculated, or a running average over a selected time or distance can be used. In another embodiment, voids 3112 greater than a selected size can be counted to determine the amount of uniformity. In another method, standard deviation from trench profile curve 3110 can be calculated and then averaged between multiple images.

Figure 16:
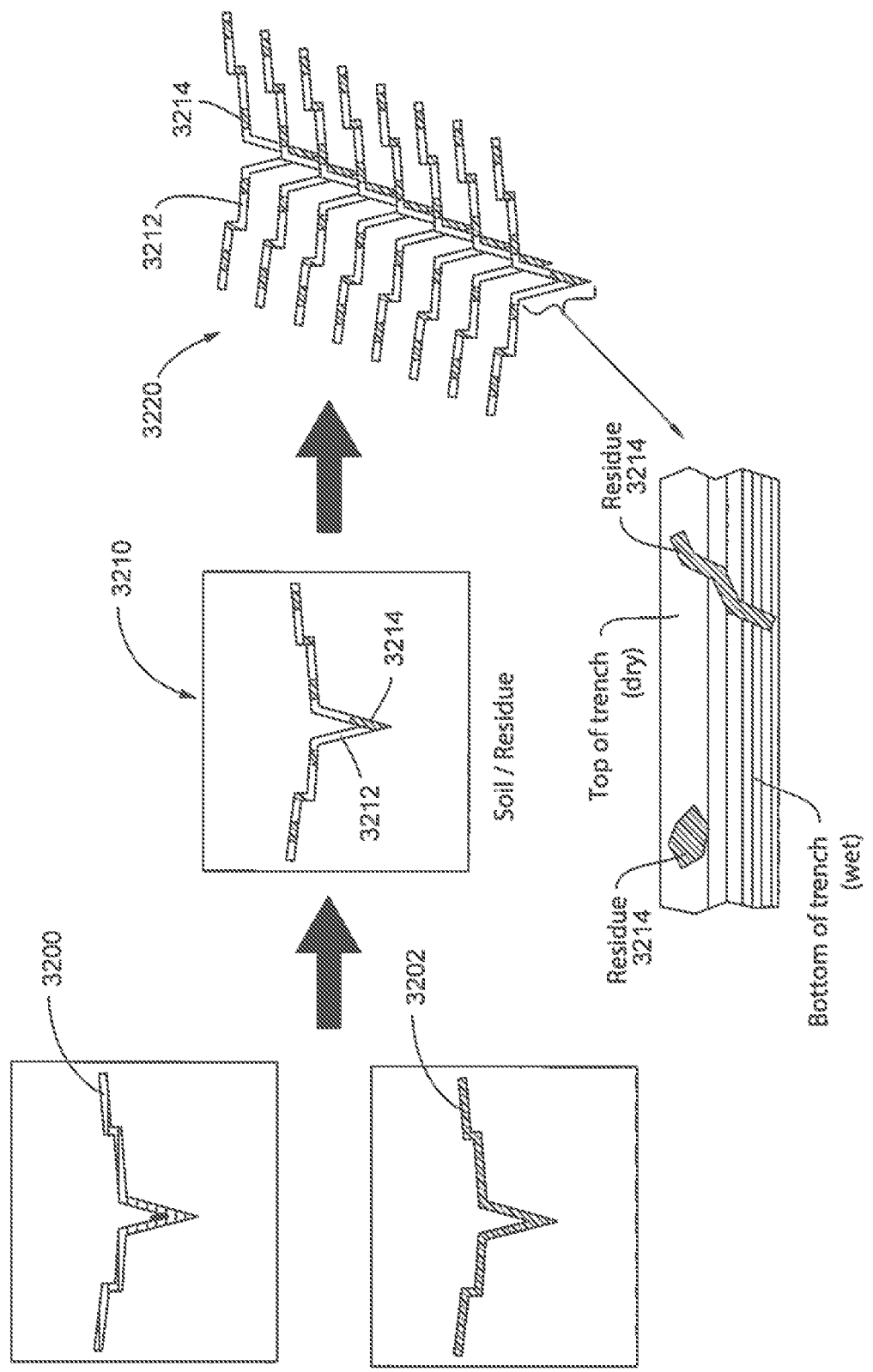
FIG. 16 illustrates a process of determining soil and residue in a trench.
Figure 17:
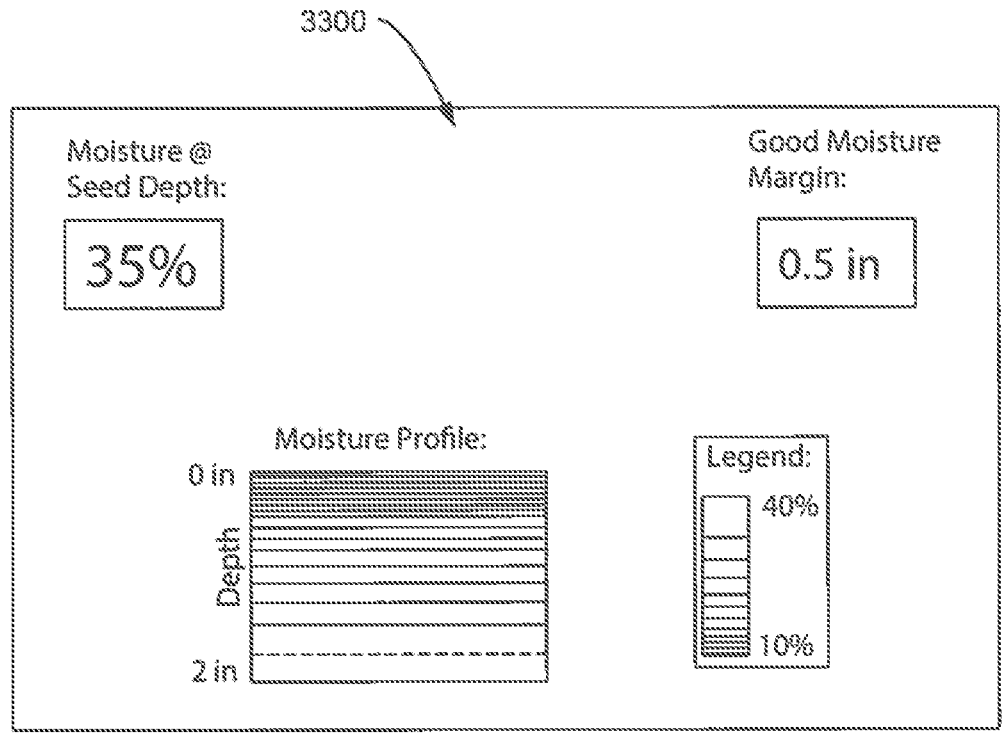
FIG. 17 illustrates a screen displaying soil moisture in a trench.
Figure 18:
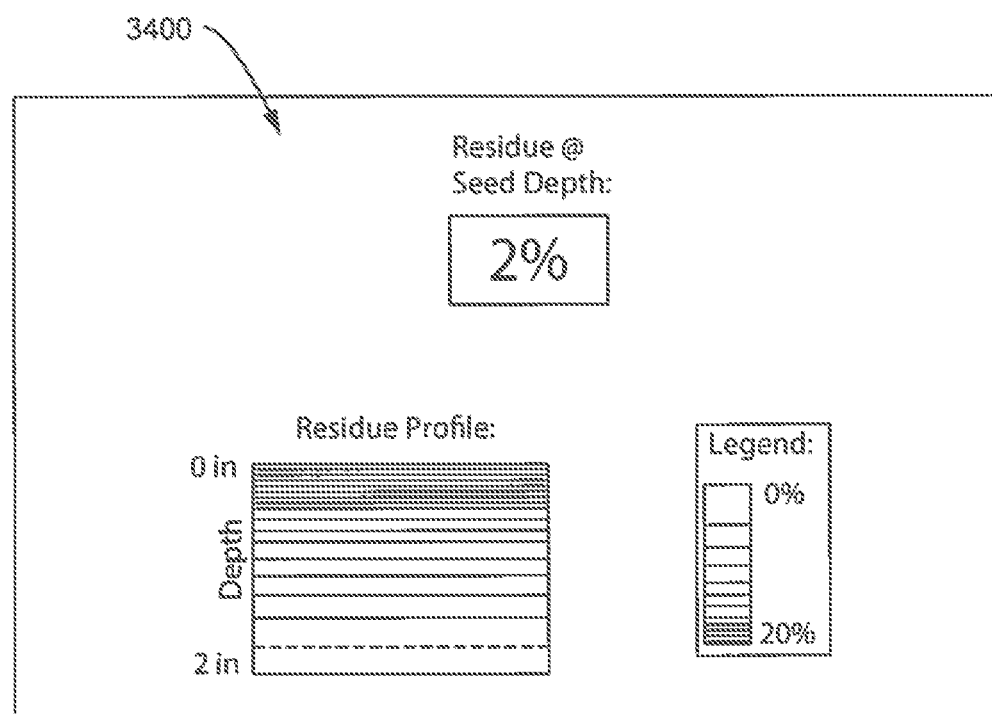
FIG. 18 illustrates a screen displaying residue in a trench.

In another embodiment, soil moisture and/or residue can be calculated. FIG. 16 illustrates the process for calculation. Reflected intensity of wavelength A 3200 and reflected intensity of wavelength B 3202 are captured. In other embodiments, additional wavelengths can be used. In one embodiment, one wavelength can be 640 nm and the other can be 940 nm. The relative intensity of reflected intensity of wavelength A 3200 compared to reflected intensity of wavelength B 3202 is calculated. Relative intensity between the two wavelengths reveals whether the reflection at a given point is residue (organic crop residue) or soil. For each image, a soil/residue image 3210 is generated. As illustrated, soil 3212 may be shown in once color (e.g., green) and residue 3214 may be shown in another color (e.g., red). Multiple images can be combined to provide a soil/residue trench profile 3220 shown in perspective view or in side elevation view. Relative moisture and actual moisture calculations are described below. From the trench profile 3220, the following metrics can be calculated: total residue percentage in seed trench 3, an amount or percentage of residue at seed depth, a residue depth profile (such as top half of the trench and the bottom half of the trench. e.g. top half 50% residue and bottom half 10% residue), moisture versus depth, moisture at seed depth, depth to minimum good moisture (moisture for starting germination), and/or moisture margin (seed depth minus minimum good moisture depth. Moisture margin informs a grower how much depth can be varied but still be within good moisture. FIG. 17 illustrates a screen 3300 showing one or more of moisture at seed depth and moisture profile at different depths in seed trench 3. FIG. 18 illustrates a screen 3400 showing one or more of residue at seed depth and residue profile at different depths in seed trench 3.

Figure 19:
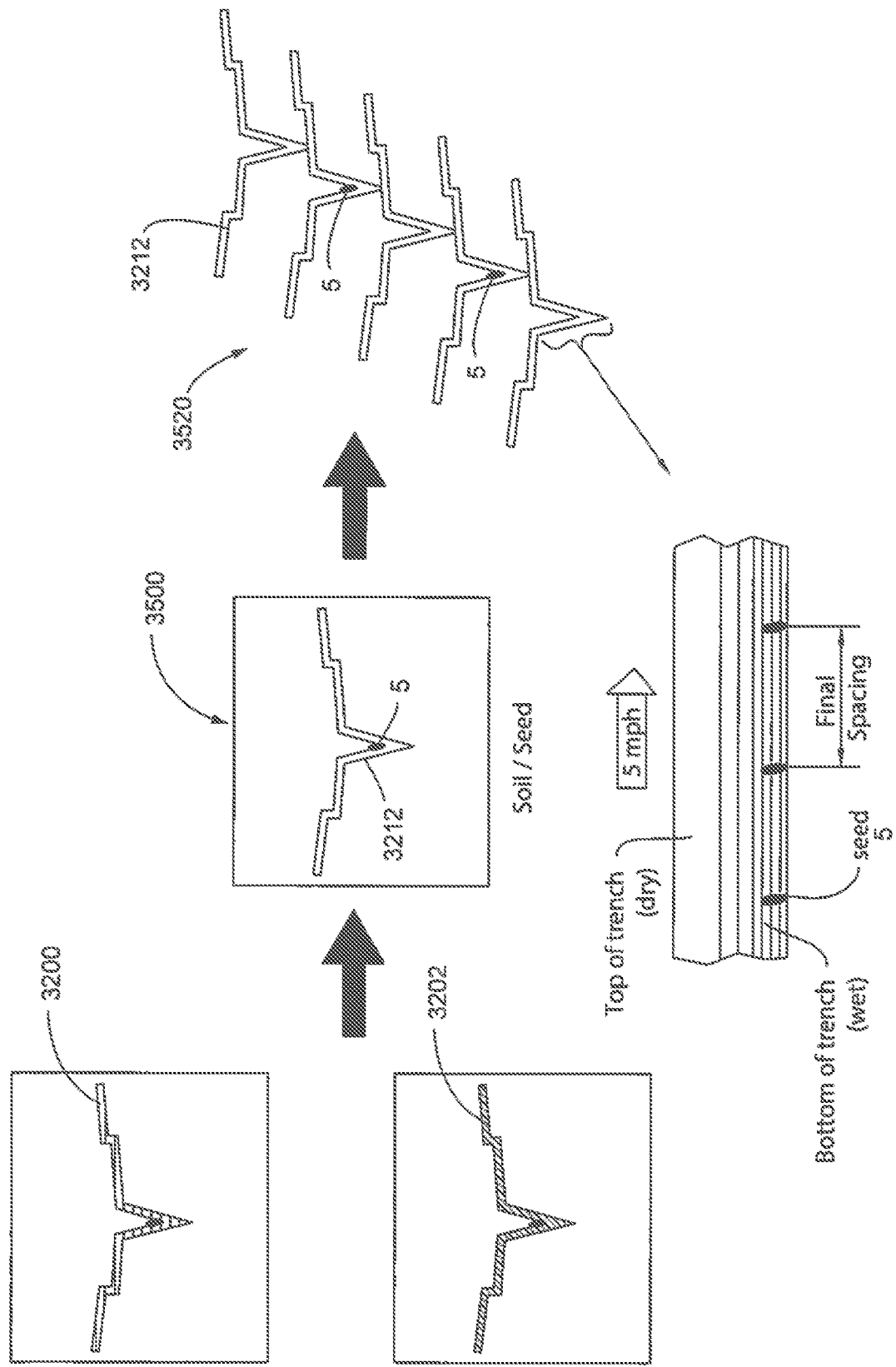
FIG. 19 illustrates a process of determining seed placement in a trench.

In another embodiment, seed placement can be determined. FIG. 19 illustrates the process. Reflected intensity of wavelength A 3200 and reflected intensity of wavelength B 3202 are captured. In other embodiments, additional wavelengths can be used. In one embodiment, one wavelength can be 640 nm and the other can be 940 nm. The relative intensity of reflected intensity of wavelength A 3200 compared to reflected intensity of wavelength B 3202 is calculated. Relative intensity between the two wavelengths reveals whether the reflection at a given point is seed 5 or soil. For each image, a soil/seed image 3500 is generated. As illustrated, soil 3212 may be shown in one color (e.g., green) and the seed 5 may be shown in another color (e.g., red). Multiple images can be combined to provide a soil/seed trench profile 3520 shown in perspective view or in side elevation view. This works well in tilled fields when there is little to no residue. In some situations, it may be difficult to distinguish between seed 5 and residue. In these embodiments, image D using white light can be used. Seeds 5 are usually coated, and colors are used to distinguish different seed treatments. Knowing the color of the seed 5 that is being planted, Image D can be used to look for color reflection corresponding to the color of the seed 5. Seed placement provides spacing information (described below), population, and can be used for placement of material on or adjacent to the seed 5 (described below).

In other embodiments, the light can be white light and one or more filters can be used with receiver 2003 to select one wavelength of light to view. In this embodiment, receiver 2003 can be a red-green-blue (RGB) camera or a blue-green-near-infrared camera. As above, multiple filters can be used sequentially to capture different wavelengths of light in different images.

Relative intensity data from the light plane triangulator 2000 can be combined with other sensors, such as SmartFirmer sensor (which is available from Precision Planting LLC and is described in International Patent Publication Nos. WO2014153157, WO2015171915, WO2015171908, or U.S. Patent Application Publication No. 2018/0168094. The sensor mounted on the SmartFirmer sensor can provide a detailed analysis of the bottom of the seed trench 3, and the light plane triangulator 2000 can provide analysis of higher points in the seed trench 3. The firmer mounted sensor has a high confidence in moisture, but it only "looks" at the bottom/side of the trench. The intensity ratio from the light plane triangulator 2000 provides a good depth versus moisture, but it has a lower accuracy with respect to absolute moisture. Knowing the moisture at the bottom of trench 3 from the firmer mounted sensor, absolute moisture above the bottom of trench 38 can be calculated from the relative soil moisture.

Figure 12:
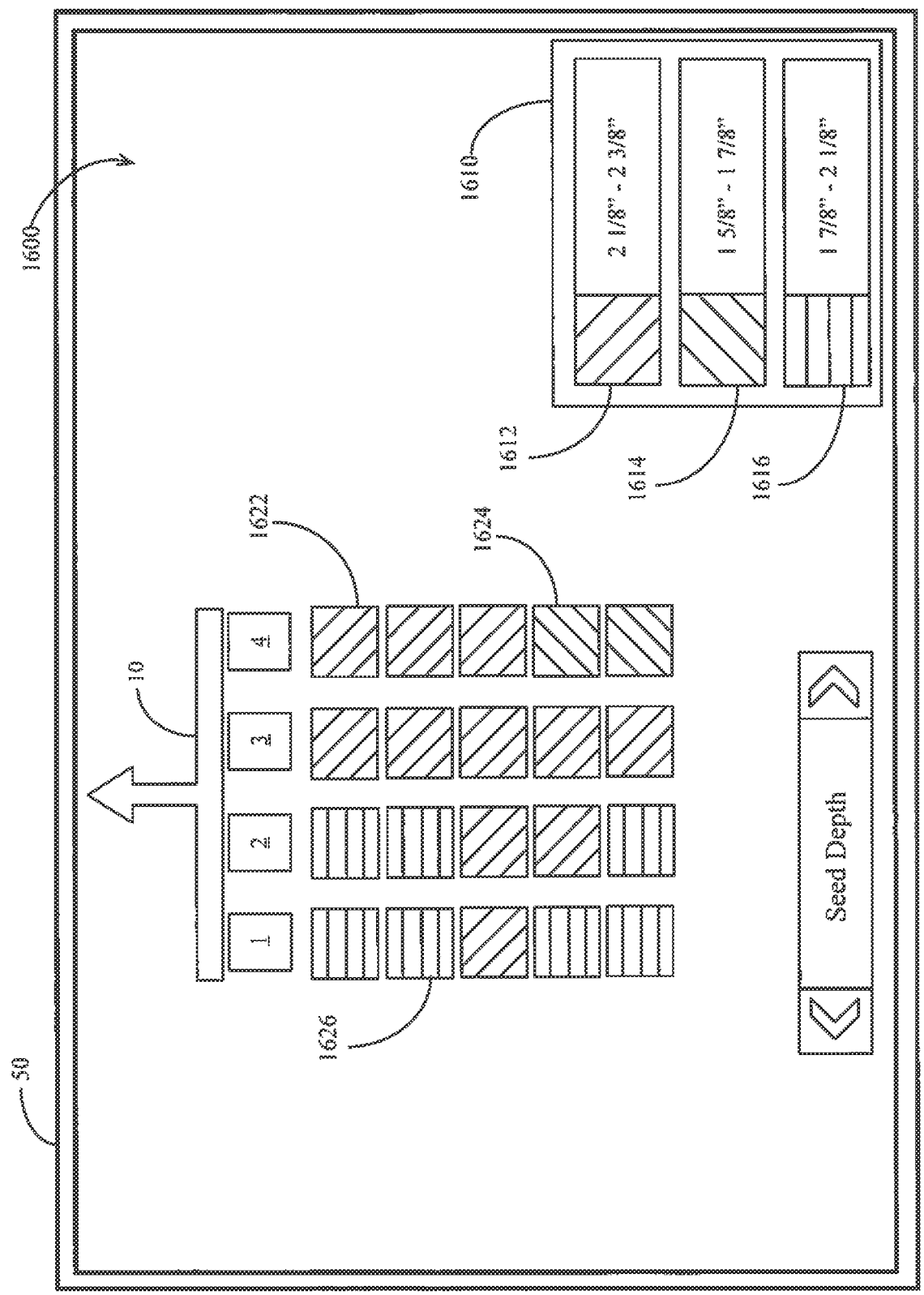
FIG. 12 illustrates an embodiment of a graphical display including a spatial map of seed depth.

The images captured by the light plane triangulator 2000 can provide a cross sectional view of seed trench 3. Distance measuring software can measure a distance from the top of seed trench 3 to the bottom of seed trench 3 to provide a depth of the seed trench 3. Images captured by the light plane triangulator 2000 can also capture the placement of the seeds 5 in seed trench 3 to confirm whether the seeds are placed in the bottom of the trench 3, and optionally, whether the seeds 5 are firmed by seed firmer 400. A depth of the seed 5 in the seed trench 3 can be measured. Referring to FIG. 12, the seed depth may be displayed spatially on a seed depth map 1600 displayed (e.g., on the implement monitor 50 or remote computer). Areas of the field may be associated with graphical representations 1622, 1624, 1626 (e.g., pixels or blocks) associated by color or pattern with subsets 1612, 1614, 1616, respectively of a legend 1610. The subsets may correspond to numerical ranges of seed depth. The numerical ranges can be scaled based on a selected depth for seed planting. Different types of seeds can be planted at different depths. In one embodiment, a color green can be associated with a seed planted at the selected depth, and other colors can be used to represent a depth shallower or deeper than the selected depth.

Figure 13A:
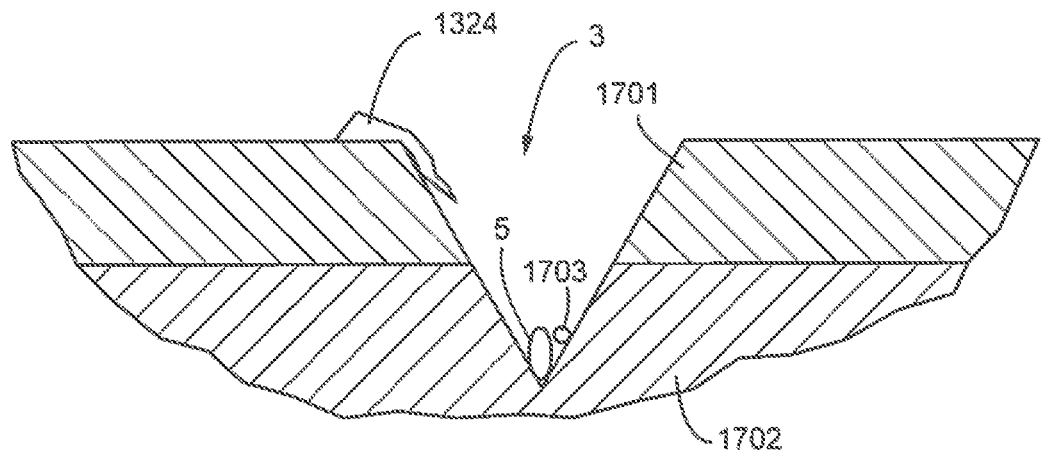
FIG. 13A is an illustration of a seed trench profile.
Figure 13B:
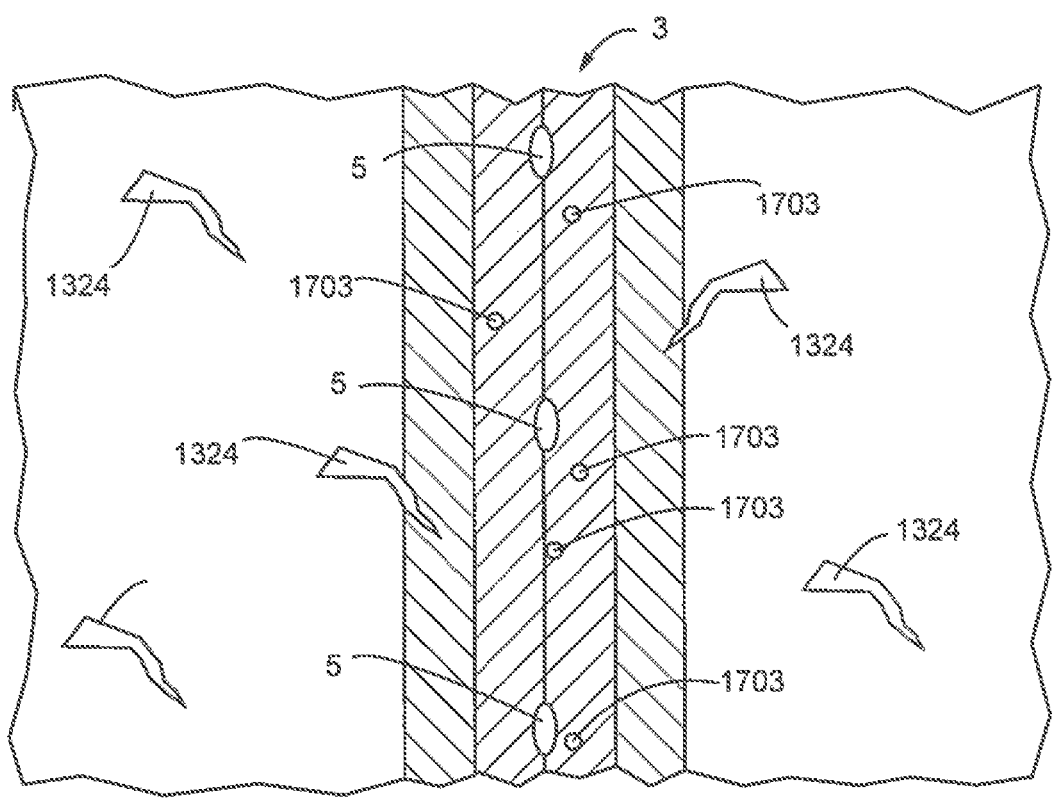
FIG. 13B illustrates a top view of the seed trench of FIG. 13A.

Referring to FIGS. 13A and 13B, a profile of a seed trench 3 showing a soil moisture profile may be displayed based on a color of the soil. Drier soil 1701 (shown toward the top of the trench 3) has a light color, whereas moister soil 1702 (shown toward the bottom of the trench 3) has a darker color. Also, placement and depth of seed 5, crop residue 3214, and dry soil 1703 can be displayed. Dry soil 1703 may be dry soil that falls into the seed trench 3 from the top of the seed trench 3 or from outside of the seed trench 3. When the seed 5 is not in moist soil 1702, the above described depth adjustment can be made to increase depth until the seed 5 is in moist soil 1702. If there is sufficient moist soil 1702, then the depth can be decreased to a selected depth.

In another embodiment, tracking the placement of seeds 5 with light plane triangulator 2000 can provide a seed pulse similar to the seed pulse described in International Patent Publication No. WO2015/171915. This seed pulse can be used to track "good spacing", or the seed pulse can be used with pulsing a valve (not shown), such as is described in U.S. Pat. No. 7,370,589 to place fluid on or adjacent to a seed. The image from the light plane triangulator 2000 can detect a seed in the image, and the processor can generate a seed pulse. The processor can then send a signal to the valve to selectively open and close to place fluid on or adjacent to the seed.

In another embodiment, when residue 3214 and/or dry soil 1703 from the top of the seed trench 3 or outside of the seed trench 3 is detected as being present in the seed trench 3 or on the seed 5, the row cleaner assembly 200 may be adjusted to increase debris removal by increasing the downforce applied to the actuator 208. An image from light plane triangulator 2000 may identify residue 3214 or dry soil 1703 present in seed trench 3, and a signal may be sent from the processor in the monitor 50 to the actuator 208 to change the downforce of the row cleaner 200.

Depth Control Systems

The depth control and soil monitoring system 300 is used in conjunction with depth adjustment systems from International Patent Publication No. WO2017/143125. Part numbers listed below are from WO2017/143125.

Figure 11:
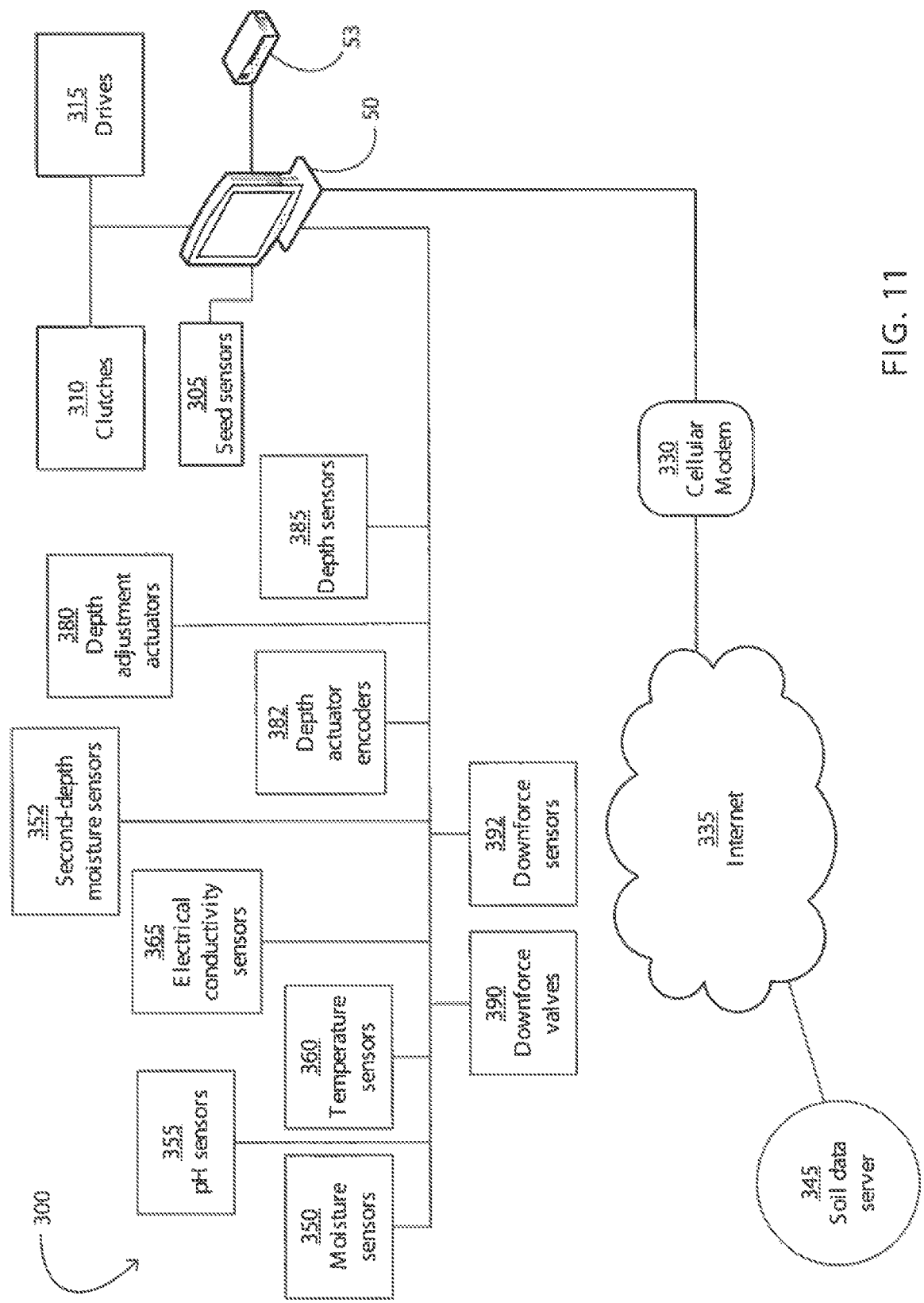
FIG. 11 schematically illustrates an embodiment of a system for controlling furrow depth.

The depth adjustment actuators/motors (e.g., secondary depth adjustment actuators/motors) disclosed therein (e.g., actuators/motors 720, 800, 950, 1000, 1230, 1450, 1550, 1650, 1750, 1850, 1950, 1984) may be in data communication with a depth control and the soil monitoring system 300 as illustrated in FIG. 11 and described herein.

In the system 300, a monitor 50 is in electrical communication with components associated with each row unit 10 including seed meter drives 315, seed sensors 305, the GPS receiver 53, downforce sensors 392, downforce valves 390, depth adjustment actuators 380, and depth actuator encoders 382 (and in some embodiments actual depth sensors 385 such as those described in applicant's U.S. Patent Application Publication Number 2015/0298438). In some embodiments, particularly those in which each seed meter 30 is not driven by an individual drive 315, the monitor 50 may be in electrical communication with clutches 310 configured to selectively operably couple the seed meter 30 to the drive 315.

Continuing to refer to FIG. 11, the monitor 50 may be in electrical communication with a cellular modem 330 or other component configured to place the monitor 50 in data communication with the Internet, indicated by reference numeral 335. Via the Internet connection, the monitor 50 may receive data from a soil data server 345. The soil data server 345 may include soil map files (e.g., shape files) associating soil types (or other soil characteristics) with GPS locations. In some embodiments, soil map files are stored in the memory of the monitor 50.

The monitor 50 may also be in electrical communication with one or more temperature sensors 360 mounted to the planter and configured to generate a signal related to the temperature of soil being worked by the planter row units 10. In some embodiments one or more of the temperature sensors 360 comprise thermocouples disposed to engage the soil as disclosed in Applicant's International Patent Pub. No. WO2014/153157. In such embodiments, the temperature sensors 360 engage the soil at the bottom of the trench 3. In other embodiments, one or more of the temperature sensors 360 may comprise a sensor disposed and configured to measure the temperature of the soil without contacting the soil.

Continuing to refer to FIG. 11, the monitor 50 may be in electrical communication with one or more moisture sensors 350 mounted to the planter and configured to generate a signal related to the temperature of soil being worked by the planter row units 10. In some embodiments, the moisture sensor 350 comprises a reflectance sensor such as that disclosed in U.S. Pat. No. 8,204,689. In such embodiments, the moisture sensor 350 may be mounted to the shank 15 of the row unit 10 and disposed to measure the soil moisture at the bottom of the trench 3, which may be at a position longitudinally forward of the seed tube 32. The monitor 50 may be in electrical communication with one or more second-depth moisture sensors 352. The second-depth moisture sensor 352 may comprise a reflectance sensor such as that disclosed in the '689 patent, disposed to measure soil moisture at a depth at which consistent moisture reading is expected. In some embodiments the second-depth moisture sensor 352 is disposed to measure soil moisture at a greater depth than used for planting, such as between 3 and 6 inches and preferably approximately 4 inches below the soil surface. In other embodiments the second-depth moisture sensor 352 is disposed to measure soil moisture at a lesser depth than used for planting, such as between 0.25 inch and 1 inch and preferably approximately 0.5 inches below the soil surface. The second-depth moisture sensor 352 may be disposed to open a trench laterally offset from the trenches 3 opened by the row units 10.

Referring to FIG. 11, the monitor 50 may be in electrical communication with one or more electrical conductivity sensors 365. The electrical conductivity sensor 365 preferably comprises one or more electrodes disposed to cut into the soil surface such as the sensors disclosed in U.S. Pat. Nos. 5,841,282 and 5,524,560.

Continuing to refer to FIG. 11, the monitor 50 may also be in electrical communication with one or more pH sensors 355. In some embodiments the pH sensor 355 is drawn by a tractor or by another implement (e.g., a tillage implement) such that data is stored in the monitor 50 for later use. In some such embodiments, the pH sensor 355 is similar to that disclosed in U.S. Pat. No. 6,356,830. In some embodiments, the pH sensor 355 may be mounted to the toolbar 8, such as at a position laterally offset from the row units 10.

Depth Control Methods

According to some exemplary processes of controlling depth using the depth adjustment assemblies described herein, a user may manually adjust the primary and/or secondary depth adjustment assemblies. According to some exemplary processes, the user may manually adjust the primary depth adjustment assembly and use the monitor 50 to command a depth adjustment to the secondary depth adjustment assembly.

According to some exemplary processes, the user may manually adjust the primary depth adjustment assembly and the monitor 50 may command a desired depth adjustment to the secondary depth adjustment assembly (e.g., one of the actuators/motors 720, 800, 950, 1000, 1230, 1450, 1550, 1650, 1750, 1850, 1950, 1984) by receiving one or more agronomic variables from the sensors (e.g., sensors 350, 355, 360, 365, 352, 385) or from the soil data server 345 and determining a desired depth adjustment by consulting a database or algorithm relating one or more agronomic variables to a desired furrow depth.

According to some exemplary processes, the monitor 50 may command a desired depth adjustment to the primary depth adjustment assembly and/or to the secondary depth adjustment assembly (e.g., one of the actuators/motors 720, 800, 950, 1000, 1230, 1450, 1550, 1650, 1750, 1850, 1950, 1984) by receiving one or more agronomic variables from the sensors (e.g., sensors 350, 355, 360, 365, 352, 385) or from the soil data server 345 and determining a desired depth adjustment by consulting a database or algorithm relating one or more agronomic variables to a desired furrow depth.

According to some exemplary processes, the monitor 50 may command a desired depth adjustment to the primary depth adjustment assembly and/or to the secondary depth adjustment assembly (e.g., one of the actuators/motors 720, 800, 950, 1000, 1230, 1450, 1550, 1650, 1750, 1850, 1950, 1984) by determining the GPS-reported location of the row unit 10 and consulting a depth prescription map spatially relating locations and/or regions in the field to desired furrow depths.

In some embodiments, the monitor 50 may record changes in depth in the field by associating commanded actuations of the actuator/motor 720, 800, 950, 1000, 1230, 1450, 1550, 1650, 1750, 1850, 1950, 1984 with GPS locations reported by the GPS receiver 53. In some such embodiments, the monitor 50 may record a change in depth concurrently with the commanded actuations of the actuator/motor 720, 800, 950, 1000, 1230, 1450, 1550, 1650, 1750, 1850, 1950. However, in operation, the force between the rocker 95 and the gauge wheel arm and/or the depth adjustment member may vary, e.g., as the row unit moves across uneven terrain. Thus, in some embodiments the monitor 50 may monitor the force on the gauge wheel arm and/or the depth adjustment rocker and record the change in depth only when the force is lower than a predetermined threshold. For example, with respect to the embodiment of FIG. 12, the monitor 50 may monitor the force on the gauge wheel arm and/or the depth adjustment rocker and record the change in depth only when the force is lower than a predetermined threshold at which the depth adjustment member can be advanced for a given position of the actuator 1230. The force on the gauge wheel arm and/or the depth adjustment rocker may be recorded by a load sensor such as a strain gauge mounted to the gauge wheel arm or other location through which the force is transmitted, or by a load sensing pin incorporated in the row unit as is known in the art.

In other implementations, the monitor 50 may command a temporary change (e.g., reduction) in row unit downforce applied by the actuator 18 concurrently with (or before or after) a commanded change in the extension of the actuator/motor 720, 800, 950, 1000, 1230, 1450, 1550, 1650, 1750, 1850, 1950, 1984 in order to permit the depth adjustment. The monitor 50 then preferably commands the row unit downforce applied by the actuator 18 to return to its previously commanded level.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures but is to be accorded the widest scope consistent with the spirit and scope of the appended claims.

The invention claimed is:

1. An agricultural trench depth sensing system, comprising:
   an agricultural row unit including an opening disc configured to open a trench in a soil surface as the row unit advances in a forward direction of travel through a field; and
   a light source disposed above said trench and configured to direct light downwardly toward said trench;
   a receiver disposed at an angle relative to said light source to receive reflected light from said light source reflected from said trench and soil surface;
   a sensor connected to said receiver, said sensor generating an output signal based on said reflected light;
   wherein said light source, said receiver and said sensor are mounted on an appurtenance supported from a frame member of said row unit, said appurtenance extending rearwardly from said opening disc and longitudinally aligned with said trench, and wherein said appurtenance is a seed firmer, said seed firmer having a ground engaging portion disposed in said trench;
   a monitoring system in communication with said sensor, said monitor system configured to generate a data frame based on said sensor output signal, said data frame containing a triangulated line pattern and intensity values of said reflected light along said triangulated line pattern indicative of a measured depth of said trench;
   a GPS receiver in communication with said monitoring system;
   whereby said monitor system is configured to associate GPS coordinates from said GPS receiver with each said data frame.

2. The agricultural trench depth sensing system of claim 1, wherein said light source, said receiver and said sensor are disposed in a single body mounted to a frame member of said agricultural row unit.

3. The agricultural trench depth sensing system of claim 1, wherein said light source, said receiver and said sensor are separately disposed and supported on said row unit rearward of said opening disc.

4. The agricultural trench depth sensing system of claim 1, wherein said light source and said receiver are disposed on an underside of said seed firmer.

5. The agricultural trench depth sensing system of claim 1, wherein said light source is disposed over said seed firmer directing light downwardly toward said soil surface and into said trench and said receiver disposed on an underside of said seed firmer.

6. The agricultural trench depth sensing system of claim 1, wherein said light source includes a first light source and a second light source, said first light source disposed over said seed firmer directing light downwardly toward said soil surface on at least one side of said trench, said second light source disposed on an underside of said seed firmer directing light into said trench, said receiver disposed on an underside of said seed firmer and disposed to receive said reflected light from said first light source and said second light source.

7. The agricultural trench depth sensing system of claim 1, wherein said monitoring system is configured to display a spatial map of said measured depths of said trench as said agricultural row unit advances through said field.

8. The agricultural trench depth sensing system of claim 1, further comprising:
a downforce actuator configured to apply a downforce on said agricultural row unit;
wherein said monitoring system is configured to actuate said downforce actuator to adjust downforce applied to said agricultural row unit based on said measured depth.

9. The agricultural trench depth sensing system of claim 1, further comprising:
a depth control actuator configured to adjust a depth of said trench;
wherein said monitoring system is configured to actuate said depth control actuator to adjust depth of said trench based on said measured depth.

10. The agricultural trench depth sensing system of claim 1, wherein said light from said light source is modulated to produce light of different wavelengths, whereby said data frame contains triangulated line patterns and intensity values of said different wavelengths of said reflected light along said triangulated line pattern, and whereby a relationship between said triangulated line patterns and said intensity values along said triangulated line pattern is indicative of at least one of: (i) uniformity of said trench; (ii) relative soil moisture versus trench depth; (iii) presence of dry topsoil in said trench; (iv) presence of residue in said trench; (v) presence of a seed in said trench; (vi) a depth of said seed in said trench; and (vii) depth of gauge wheels relative to full trench depth.

11. The agricultural trench depth sensing system of claim 10, wherein said monitoring system is configured to generate a profile of said trench based on said generated data frame.

12. The agricultural trench depth sensing system of claim 10, wherein said monitoring system is configured to display a spatial map of seed depth as said agricultural row unit advances through said field.

13. The agricultural trench depth sensing system of claim 10, further comprising:
a depth control actuator configured to adjust a depth of said trench;
wherein said monitoring system is configured to actuate said depth control actuator to adjust depth of said trench based on said data frame indicative of said presence of dry topsoil soil in said trench.

14. The agricultural trench depth sensing system of claim 12, further comprising:
a depth control actuator configured to adjust a depth of said trench;
wherein said monitoring system is configured to actuate said depth control actuator to adjust depth of said trench based on said data frame indicative of said seed depth in relation to said relative soil moisture.

15. The agricultural trench depth sensing system of claim 10, further comprising:
a row cleaner mounted forward of said opening disc, said row cleaner including a row cleaner actuator for adjusting downforce applied to said row cleaner;
wherein said monitoring system is configured to actuate said row cleaner actuator to adjust said downforce applied by said row cleaner actuator to said row cleaner based on said presence of residue in said trench.

16. The agricultural trench depth sensing system of claim 10, further comprising:
a liquid placement system in fluid communication with a liquid source, said liquid placement system including a valve movable between an open position and a closed position, wherein in said open position fluid from said fluid source is released;
wherein said monitoring system is configured to open said valve to release liquid relative to said seeds in said trench such that said liquid is placed either on said seeds, between said seeds or adjacent to said seeds.

17. The agricultural trench depth sensing system of claim 10, wherein a first image is generated based on said reflected light of a first wavelength of said different wavelengths, and wherein a second image is generated based on said reflected light of a second wavelength of said different wavelengths, and wherein a third image is generated when said light source is off;
whereby said monitoring system generates a first net image pattern by subtracting said third image from said first image, and said monitoring system generates a second net image pattern by subtracting said third image from said second image.

18. The agricultural trench depth sensing system of claim 17, wherein said uniformity of said trench is determined by comparing said first net image pattern or said second net image pattern to a trench profile curve.

19. The agricultural trench depth sensing system of claim 17, wherein said uniformity of said trench is determined by comparing said first net image pattern to said second net image pattern.

20. The agricultural trench depth sensing system of claim 17, wherein said uniformity of said trench is determined by calculating a standard deviation from a trench profile curve and averaged between the first net image pattern and the second net image pattern.

21. A method of determining depth of a trench formed in a soil surface by an opening disc of an agricultural row unit as the agricultural row unit advances in a forward direction of travel through a field, the method comprising:
illuminating the trench with a light source disposed above the trench;
with a receiver disposed at an angle relative to said light source, receiving reflected light from the light source reflected from the trench, wherein the light source and the receiver are mounted on an appurtenance supported from a frame member of the row unit, the appurtenance extending rearwardly from the opening disc and longitudinally aligned with the trench, and wherein the appurtenance is a seed firmer, the seed firmer having a ground engaging portion disposed in the trench;

generating a data frame indicative of a measured depth of the trench, said generated data frame containing a triangulated line pattern and intensity values of said reflected light along said triangulated line pattern;

associating GPS coordinates with said data frame.

22. The method of claim 21, wherein said light source and said receiver are disposed in a single body mounted to a frame member of the agricultural row unit.

23. The method of claim 21, wherein said light source and said receiver are separately disposed and supported on the agricultural row unit rearward of the opening disc.

24. The method of claim 21, wherein said light source and said receiver are disposed on an underside of said seed firmer.

25. The method of claim 21, wherein said light source is disposed over said seed firmer directing light downwardly toward said soil surface and into the trench and said receiver disposed on an underside of said seed firmer.

26. The method of claim 21, wherein said light source includes a first light source and a second light source, said first light source disposed over said seed firmer directing light downwardly toward said soil surface on at least one side of the trench, said second light source disposed on an underside of said seed firmer directing light into the trench, said receiver disposed on an underside of said seed firmer and disposed to receive said reflected light from said first light source and said second light source.

27. The method of claim 21, further comprising:
displaying a spatial map of said measured depths of the trench as the agricultural row unit advances through the field.

28. The method of claim 21, further comprising:
actuating a downforce actuator to adjust downforce applied to the agricultural row unit based on said measured depths.

29. The method of claim 21, further comprising:
adjusting a depth control actuator to adjust a depth of the trench based on said measured depth.

30. The method of claim 21, further comprising:
modulating said light source to produce light of different wavelengths, whereby said data frame contains triangulated line patterns and intensity values of said different wavelengths of said reflected light along said triangulated line pattern.

31. The method of claim 30, further comprising:
determining at least one of the following characteristics of the trench based on relationship between said triangulated line patterns and said intensity values along said triangulated line pattern: (i) uniformity of the trench; (ii) relative soil moisture versus trench depth; (iii) presence of dry topsoil in the trench; (iv) presence of residue in the trench; (v) presence of a seed in the trench; (vi) a depth of said seed in the trench; and (vii) depth of gauge wheels relative to full trench depth.

32. The method of claim 30, further comprising:
generating a profile of the trench, based on said generated data frame.

33. The method of claim 30, further comprising:
displaying a spatial map of seed depth as the agricultural row unit advances through the field.

34. The method of claim 31, further comprising:
actuating a depth control actuator to adjust depth of the trench based on said determination of said presence of dry topsoil soil in said trench.

35. The method of claim 31, further comprising:
actuating a depth adjustment actuator to adjust depth of the trench based on said determination of said seed depth in relation to said relative soil moisture.

36. The method of claim 31, further comprising:
actuating a row cleaner actuator to adjust downforce applied by said row cleaner actuator to a row cleaner based on said determination of said presence of residue in said trench.

37. The method of claim 31, further comprising:
based on the determination of the presence of the seeds in the trench, opening a valve to release liquid from a liquid source relative to said seeds such that said liquid is placed either on said seeds, between said seeds or adjacent to said seeds.

38. The method of claim 30, further comprising:
generating a first image based on said reflected light of a first wavelength of said different wavelengths;
generating a second image based on said reflected light of a second wavelength of said different wavelengths
generating a third image is when said light source is off;
generating a first net image pattern by subtracting said third image from said first image;
generating a second net image pattern by subtracting said third image from said second image.

39. The method of claim 38, further comprising:
comparing said first net image pattern or said second net image pattern to a trench profile curve to determine said uniformity of the trench.

40. The method of claim 38, further comprising:
comparing said first net image pattern to said second net image pattern to determine said uniformity of the trench.

41. The method of claim 38, further comprising:
calculating a standard deviation from a trench profile curve averaged between the first net image pattern and the second net image pattern to determine said uniformity of the trench.

* * * * *